(12) United States Patent
Wang et al.

(10) Patent No.: US 8,825,466 B1
(45) Date of Patent: Sep. 2, 2014

(54) MODIFICATION OF ANNOTATED BILINGUAL SEGMENT PAIRS IN SYNTAX-BASED MACHINE TRANSLATION

(75) Inventors: Wei Wang, Culver City, CA (US); Jonathan May, Los Angeles, CA (US); Kevin Knight, Marina del Rey, CA (US)

(73) Assignees: Language Weaver, Inc., Los Angeles, CA (US); University of Southern California, Los Angeles, CA (US)

( * ) Notice: Subject to any disclaimer, the term of this patent is extended or adjusted under 35 U.S.C. 154(b) by 1169 days.

(21) Appl. No.: 11/811,228

(22) Filed: Jun. 8, 2007

(51) Int. Cl.
*G06F 17/28* (2006.01)
*G06F 17/20* (2006.01)
*G06F 17/27* (2006.01)
*G06F 17/21* (2006.01)

(52) U.S. Cl.
USPC ............... 704/2; 704/4; 704/5; 704/7; 704/8; 704/9; 704/10

(58) Field of Classification Search
USPC ................... 704/2, 4–5, 9, 240, 251
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,615,002 A | 9/1986 | Innes | |
| 4,661,924 A | 4/1987 | Okamoto et al. | |
| 4,787,038 A | 11/1988 | Doi et al. | |
| 4,791,587 A | 12/1988 | Doi | |
| 4,800,522 A | 1/1989 | Miyao et al. | |
| 4,814,987 A | 3/1989 | Miyao et al. | |
| 4,942,526 A | 7/1990 | Okajima et al. | |
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |
| 5,167,504 A | 12/1992 | Mann | |

(Continued)

FOREIGN PATENT DOCUMENTS

| | | |
|---|---|---|
| CA | 2408819 | 11/2006 |
| CA | 2475857 | 12/2008 |

(Continued)

OTHER PUBLICATIONS

Galley et al "What's in a translation rule?", 2004, In Proc. of HLT/NAACL '04, pp. 1-8.*

(Continued)

*Primary Examiner* — Richemond Dorvil
*Assistant Examiner* — Olujimi Adesanya
(74) *Attorney, Agent, or Firm* — Carr & Ferrell LLP

(57) ABSTRACT

Systems and methods for automatically modifying an annotated bilingual segment pair are provided. An annotated bilingual segment pair ("Pair") may be modified to generate improved translation rules used in machine translation of documents from a source language to a target language. Because a single Pair may be used to translate a phrase, many Pairs are used in a machine translation system and manual correction of each model is impractical. Each Pair may be modified by re-labeling syntactic categories within the Pair, re-structuring a tree within the Pair, and/or re-aligning source words to target words within the Pair. In exemplary embodiments, many alternate Pairs (or portions thereof) are generated automatically, rule sequences corresponding to each are derived, and one or more rule sequences are selected. Using the selected rule sequence, a modified Pair is distilled.

27 Claims, 9 Drawing Sheets

(56) References Cited

U.S. PATENT DOCUMENTS

| | | | |
|---|---|---|---|
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,473,896 B1 | 10/2002 | Hicken et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,604,101 B1 | 8/2003 | Chan et al. |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,910,003 B1 * | 6/2005 | Arnold et al. .................... 704/4 |
| 6,952,665 B1 | 10/2005 | Shimomura et al. |
| 6,983,239 B1 | 1/2006 | Epstein |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |

(56) References Cited

U.S. PATENT DOCUMENTS

| | | | |
|---|---|---|---|
| 7,206,736 | B2 | 4/2007 | Moore |
| 7,209,875 | B2 | 4/2007 | Quirk et al. |
| 7,219,051 | B2 | 5/2007 | Moore |
| 7,239,998 | B2 | 7/2007 | Xun |
| 7,249,012 | B2 | 7/2007 | Moore |
| 7,249,013 | B2 | 7/2007 | Al-Onaizan et al. |
| 7,283,950 | B2 | 10/2007 | Pournasseh et al. |
| 7,295,962 | B2 | 11/2007 | Marcu |
| 7,295,963 | B2 | 11/2007 | Richardson et al. |
| 7,302,392 | B1 | 11/2007 | Thenthiruperai et al. |
| 7,319,949 | B2 | 1/2008 | Pinkham |
| 7,328,156 | B2 * | 2/2008 | Meliksetian et al. ......... 704/257 |
| 7,340,388 | B2 | 3/2008 | Soricut et al. |
| 7,346,487 | B2 | 3/2008 | Li |
| 7,346,493 | B2 | 3/2008 | Ringger et al. |
| 7,349,839 | B2 | 3/2008 | Moore |
| 7,349,845 | B2 | 3/2008 | Coffman et al. |
| 7,356,457 | B2 | 4/2008 | Pinkham et al. |
| 7,369,998 | B2 | 5/2008 | Sarich et al. |
| 7,373,291 | B2 | 5/2008 | Garst |
| 7,383,542 | B2 | 6/2008 | Richardson et al. |
| 7,389,222 | B1 | 6/2008 | Langmead et al. |
| 7,389,234 | B2 | 6/2008 | Schmid et al. |
| 7,403,890 | B2 | 7/2008 | Roushar |
| 7,409,332 | B2 | 8/2008 | Moore |
| 7,409,333 | B2 | 8/2008 | Wilkinson et al. |
| 7,447,623 | B2 | 11/2008 | Appleby |
| 7,454,326 | B2 | 11/2008 | Marcu et al. |
| 7,496,497 | B2 | 2/2009 | Liu |
| 7,533,013 | B2 | 5/2009 | Marcu |
| 7,536,295 | B2 | 5/2009 | Cancedda et al. |
| 7,546,235 | B2 | 6/2009 | Brockett et al. |
| 7,552,053 | B2 | 6/2009 | Gao et al. |
| 7,565,281 | B2 | 7/2009 | Appleby |
| 7,574,347 | B2 | 8/2009 | Wang |
| 7,580,828 | B2 | 8/2009 | D'Agostini |
| 7,580,830 | B2 | 8/2009 | Al-Onaizan et al. |
| 7,587,307 | B2 | 9/2009 | Cancedda et al. |
| 7,620,538 | B2 | 11/2009 | Marcu et al. |
| 7,620,632 | B2 | 11/2009 | Andrews |
| 7,624,005 | B2 | 11/2009 | Koehn et al. |
| 7,624,020 | B2 | 11/2009 | Yamada et al. |
| 7,627,479 | B2 | 12/2009 | Travieso et al. |
| 7,680,646 | B2 | 3/2010 | Lux-Pogodalla et al. |
| 7,689,405 | B2 | 3/2010 | Marcu |
| 7,698,124 | B2 | 4/2010 | Menezes et al. |
| 7,698,125 | B2 | 4/2010 | Graehl et al. |
| 7,707,025 | B2 | 4/2010 | Whitelock |
| 7,711,545 | B2 | 5/2010 | Koehn |
| 7,716,037 | B2 | 5/2010 | Precoda et al. |
| 7,801,720 | B2 | 9/2010 | Satake et al. |
| 7,813,918 | B2 | 10/2010 | Muslea et al. |
| 7,822,596 | B2 | 10/2010 | Elgazzar et al. |
| 7,925,494 | B2 | 4/2011 | Cheng et al. |
| 7,957,953 | B2 | 6/2011 | Moore |
| 7,974,833 | B2 | 7/2011 | Soricut et al. |
| 8,060,360 | B2 | 11/2011 | He |
| 8,145,472 | B2 | 3/2012 | Shore et al. |
| 8,214,196 | B2 | 7/2012 | Yamada et al. |
| 8,234,106 | B2 | 7/2012 | Marcu et al. |
| 8,244,519 | B2 | 8/2012 | Bicici et al. |
| 8,265,923 | B2 | 9/2012 | Chatterjee et al. |
| 8,275,600 | B2 | 9/2012 | Bilac et al. |
| 8,296,127 | B2 | 10/2012 | Marcu et al. |
| 8,315,850 | B2 | 11/2012 | Furuuchi et al. |
| 8,380,486 | B2 | 2/2013 | Soricut et al. |
| 8,433,556 | B2 | 4/2013 | Fraser et al. |
| 8,468,149 | B1 | 6/2013 | Lung et al. |
| 8,548,794 | B2 | 10/2013 | Koehn |
| 8,600,728 | B2 | 12/2013 | Knight et al. |
| 8,615,389 | B1 | 12/2013 | Marcu |
| 8,655,642 | B2 | 2/2014 | Fux et al. |
| 8,666,725 | B2 | 3/2014 | Och |
| 8,676,563 | B2 | 3/2014 | Soricut et al. |
| 2001/0009009 | A1 | 7/2001 | Iizuka |
| 2001/0029455 | A1 | 10/2001 | Chin et al. |
| 2002/0002451 | A1 | 1/2002 | Sukehiro |
| 2002/0013693 | A1 | 1/2002 | Fuji |
| 2002/0040292 | A1 | 4/2002 | Marcu |
| 2002/0046018 | A1 | 4/2002 | Marcu et al. |
| 2002/0046262 | A1 | 4/2002 | Heilig et al. |
| 2002/0059566 | A1 | 5/2002 | Delcambre et al. |
| 2002/0078091 | A1 | 6/2002 | Vu et al. |
| 2002/0083029 | A1 | 6/2002 | Chun et al. |
| 2002/0087313 | A1 | 7/2002 | Lee et al. |
| 2002/0099744 | A1 | 7/2002 | Coden et al. |
| 2002/0111788 | A1 | 8/2002 | Kimpara |
| 2002/0111789 | A1 | 8/2002 | Hull |
| 2002/0111967 | A1 | 8/2002 | Nagase |
| 2002/0143537 | A1 | 10/2002 | Ozawa et al. |
| 2002/0152063 | A1 | 10/2002 | Tokieda et al. |
| 2002/0169592 | A1 | 11/2002 | Aityan |
| 2002/0188438 | A1 | 12/2002 | Knight et al. |
| 2002/0188439 | A1 | 12/2002 | Marcu |
| 2002/0198699 | A1 | 12/2002 | Greene et al. |
| 2002/0198701 | A1 | 12/2002 | Moore |
| 2002/0198713 | A1 | 12/2002 | Franz et al. |
| 2003/0009322 | A1 | 1/2003 | Marcu |
| 2003/0023423 | A1 | 1/2003 | Yamada et al. |
| 2003/0040900 | A1 | 2/2003 | D'Agostini |
| 2003/0061022 | A1 | 3/2003 | Reinders |
| 2003/0144832 | A1 | 7/2003 | Harris |
| 2003/0154071 | A1 | 8/2003 | Shreve |
| 2003/0158723 | A1 | 8/2003 | Masuichi et al. |
| 2003/0176995 | A1 | 9/2003 | Sukehiro |
| 2003/0182102 | A1 | 9/2003 | Corston-Oliver et al. |
| 2003/0191626 | A1 | 10/2003 | Al-Onaizan et al. |
| 2003/0204400 | A1 * | 10/2003 | Marcu et al. .................. 704/251 |
| 2003/0216905 | A1 | 11/2003 | Chelba et al. |
| 2003/0233222 | A1 | 12/2003 | Soricut et al. |
| 2004/0006560 | A1 | 1/2004 | Chan et al. |
| 2004/0015342 | A1 | 1/2004 | Garst |
| 2004/0024581 | A1 | 2/2004 | Koehn et al. |
| 2004/0030551 | A1 * | 2/2004 | Marcu et al. .................. 704/240 |
| 2004/0035055 | A1 | 2/2004 | Zhu et al. |
| 2004/0044530 | A1 | 3/2004 | Moore |
| 2004/0059708 | A1 | 3/2004 | Dean et al. |
| 2004/0068411 | A1 | 4/2004 | Scanlan |
| 2004/0098247 | A1 | 5/2004 | Moore |
| 2004/0102956 | A1 | 5/2004 | Levin |
| 2004/0102957 | A1 | 5/2004 | Levin |
| 2004/0111253 | A1 | 6/2004 | Luo et al. |
| 2004/0115597 | A1 | 6/2004 | Butt |
| 2004/0122656 | A1 | 6/2004 | Abir |
| 2004/0167768 | A1 | 8/2004 | Travieso et al. |
| 2004/0167784 | A1 | 8/2004 | Travieso et al. |
| 2004/0193401 | A1 | 9/2004 | Ringger et al. |
| 2004/0230418 | A1 | 11/2004 | Kitamura |
| 2004/0237044 | A1 | 11/2004 | Travieso et al. |
| 2004/0260532 | A1 | 12/2004 | Richardson et al. |
| 2005/0021322 | A1 | 1/2005 | Richardson et al. |
| 2005/0021517 | A1 | 1/2005 | Marchisio |
| 2005/0026131 | A1 | 2/2005 | Elzinga et al. |
| 2005/0033565 | A1 | 2/2005 | Koehn |
| 2005/0038643 | A1 | 2/2005 | Koehn |
| 2005/0055199 | A1 | 3/2005 | Ryzchachkin et al. |
| 2005/0055217 | A1 | 3/2005 | Sumita et al. |
| 2005/0060160 | A1 | 3/2005 | Roh et al. |
| 2005/0075858 | A1 | 4/2005 | Pournasseh et al. |
| 2005/0086226 | A1 | 4/2005 | Krachman |
| 2005/0102130 | A1 | 5/2005 | Quirk et al. |
| 2005/0125218 | A1 | 6/2005 | Rajput et al. |
| 2005/0149315 | A1 | 7/2005 | Flanagan et al. |
| 2005/0171757 | A1 | 8/2005 | Appleby |
| 2005/0204002 | A1 | 9/2005 | Friend |
| 2005/0228640 | A1 | 10/2005 | Aue et al. |
| 2005/0228642 | A1 | 10/2005 | Mau et al. |
| 2005/0228643 | A1 | 10/2005 | Munteanu et al. |
| 2005/0234701 | A1 * | 10/2005 | Graehl et al. ..................... 704/2 |
| 2005/0267738 | A1 | 12/2005 | Wilkinson et al. |
| 2006/0004563 | A1 | 1/2006 | Campbell et al. |
| 2006/0015320 | A1 | 1/2006 | Och |
| 2006/0018541 | A1 | 1/2006 | Chelba et al. |
| 2006/0020448 | A1 | 1/2006 | Chelba et al. |

(56) References Cited

U.S. PATENT DOCUMENTS

| | | |
|---|---|---|
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1* | 5/2006 | Menezes et al. ............ 704/10 |
| 2006/0142995 A1* | 6/2006 | Knight et al. ............. 704/9 |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |
| 2007/0033001 A1 | 2/2007 | Muslea et al. |
| 2007/0050182 A1 | 3/2007 | Sneddon et al. |
| 2007/0078654 A1* | 4/2007 | Moore .................... 704/252 |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0065478 A1 | 3/2008 | Kohlmeier et al. |
| 2008/0109209 A1 | 5/2008 | Fraser et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0234634 A1 | 9/2009 | Chen et al. |
| 2009/0241115 A1 | 9/2009 | Raffo et al. |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0138210 A1 | 6/2010 | Seo et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0191410 A1 | 8/2011 | Refuah et al. |
| 2011/0225104 A1 | 9/2011 | Soricut et al. |
| 2012/0096019 A1 | 4/2012 | Manickam et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |
| 2013/0103381 A1 | 4/2013 | Assche |
| 2013/0238310 A1 | 9/2013 | Viswanathan |
| 2014/0006003 A1 | 1/2014 | Soricut et al. |
| 2014/0019114 A1 | 1/2014 | Travieso et al. |

FOREIGN PATENT DOCUMENTS

| | | |
|---|---|---|
| CA | 2480398 | 6/2011 |
| DE | 1488338 | 4/2010 |
| DE | 202005022113.9 | 2/2014 |
| EP | 0469884 | 2/1992 |
| EP | 0715265 | 6/1996 |
| EP | 0933712 A2 | 8/1999 |
| EP | 0933712 A3 | 1/2001 |
| EP | 1488338 | 9/2004 |
| EP | 1488338 | 4/2010 |
| ES | 1488338 | 4/2010 |
| FR | 1488338 | 4/2010 |
| GB | 1488338 | 4/2010 |
| HK | 1072987 | 2/2006 |
| HK | 1072987 | 9/2010 |
| JP | 07244666 | 9/1995 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| WO | 03083710 | 10/2003 |
| WO | WO03083709 | 10/2003 |
| WO | WO2007056563 | 5/2007 |
| WO | WO2011041675 | 4/2011 |
| WO | WO2011162947 | 12/2011 |

OTHER PUBLICATIONS

Galley et al, "Scalable Inference and Training of Context-Rich Syntactic Translation Models", Jul. 2006, In Proc. of the 21st Internaltional Conf. on Computational Linguistics, pp. 961-968.*

Zhang et al, "Synchronous Binarization for Machine Translations", Jun. 4-9 2006, In Proc. of the Human language Technology Conference of the north American Chapter of the ACL, pp. 256-263.*

Klein et al, Accurate Unlexicalized Parsing, Jul. 2003, In Proc. of the 41st Annual Meeting of the ACL, pp. 423-430.*

Huang et al "Relabeling Syntax Trees to Improve Syntax-Based Machine Translation Quality", Jun. 4-9 2006, In Proc. of the Human Language Technology Conference of the North American Chapter of the ACL, pp. 240-247.*

Petrov et al, "Learning Accurate, compact, and Interpretable Tree Annotation", Jun. 4-9 2006, In Proc. of the Human Language Technology Conference of the North American Chapter of the ACL, pp. 433-440.*

Ambati, "Dependency Structure Trees in Syntax Based Machine Translation", spring 2008 report <http://www.cs.cmu.edu/~vamshi/publications/DependencyMT_report.pdf>, pp. 1-18.*

Eisner, "Learning non-isomorphic Tree Mappings for Machine Translation", 2003, In Proc. of the 41st Meeting of the ACL, pp. 205-208.*

Zhang et al, "Synchronous binarization for machine translation" Jun. 5-6, 2006, In Proc. HLT-NAACL 2006, pp. 256-263.*

Huang et al "A syntax-directed translator with extended domain of locality", Jun. 9, 2006, In Proceedings of the Workshop on Computationally Hard Problems and Joint Inference in Speech and Language Processing, pp. 1-8, New York City, New York. Association for Computational Linguistics.*

Melamed et al, "Statistical machine translation by generalized parsing", 2005, Technical Report 05-001, Proteus Project, New York University, 2005. http://nlp.cs.nyu.edu/pubs/.*

Gallet et al, "Scalable Inference and Training of Context-Rich Syntactic Translation Models", Jul. 2006, In Proceedings of the 21st International Conference on Computational Linguistics and 44th Annual Meeting of the ACL, pp. 961-968.*

Huang et al "Statistical syntax-directed translation with extended domain of locality", Jun. 9, 2006, In Proceedings of AMTA, pp. 1-8.*

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354. (NPL0228).

Frederking et al., "Three Heads are Better Than One," In Proceedings of the 4th Conference on Applied Natural Language Processing, Stuttgart, Germany, 1994, pp. 95-100. (NPL0229).

(56) References Cited

OTHER PUBLICATIONS

Och et al., "Discriminative Training and Maximum Entropy Models for Statistical Machine Translation," In Proc. of the 40th Annual Meeting of the Association for Computational Linguistics (ACL), Philadelphia, PA, 2002. (NPL0230).

Yasuda et al., "Automatic Machine Translation Selection Scheme to Output the Best Result," Proc of LREC, 2002, pp. 525-528. (NPL0231).

"Elhadad, Michael, "Using Argumentation to Control Lexical Choice: A Functional Unification Implementation",1992, Ph.D. Thesis, Graduate School of Arts and Sciences, Columbia University."

"Elhadad. M., and Robin, J., "SURGE: a Comprehensive Plug-in Syntactic Realization Component for TextGeneration", 1999 (available at http://www.cs.bgu.ac.il/-elhadad/pub.html)."

Fleming, Michael et al., "Mixed-Initiative Translation of Web Pages," AMTA 2000, LNAI 1934, Springer-Verlag, Berlin, Germany, 2000, pp. 25-29.

Och, Franz Josef and Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> retrieved on May 6, 2004! abstract.

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.

Fung et al, "Mining Very-non parallel corpora: Parallel sentence and lexicon extractioin via bootstrapping and EM", In EMNLP 2004.

"Fung, P. and Yee, L., "An IR Approach for Translating New Words from Nonparallel, Comparable Texts", 1998,36th Annual Meeting of the ACL, 17th International Conference on Computational Linguistics, pp. 414-420."

"Fung, Pascale, "Compiling Bilingual Lexicon Entries From a Non-Parallel English-Chinese Corpus", 1995, Proc, ofthe Third Workshop on Very Large Corpora, Boston, MA, pp. 173-183."

"Gale, W. and Church, K., "A Program for Aligning Sentences in Bilingual Corpora," 1991, 29th Annual Meeting ofthe ACL, pp. 177-183."

Gale, W. and Church, K., "A Program for Aligning Sentences in Bilingual Corpora," 1993, Computational Linguisitcs, vol. 19, No. 1, pp. 177-184.

Gaussier et al, "A Geometric View on Bilingual Lexicon Extraction from Comparable Corpora", In Proceedings of ACL 2004, July.

"Germann et al., "Fast Decoding and Optimal Decoding for Machine Translation", 2001, Proc. of the 39th AnnualMeeting of the ACL, Toulouse, France, pp. 228-235."

"Germann, Ulrich: "Building a Statistical Machine Translation System from Scratch: How Much Bang for theBuck Can We Expect?" Proc. of the Data-Driven MT Workshop of ACL-01, Toulouse, France, 2001."

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

"Grefenstette, Gregory, "The World Wide Web as a Resource for Example-Based Machine TranslationTasks", 1999, Translating and the Computer 21, Proc. of the 21 st International Cant. on Translating and theComputer. London, UK, 12 pp."

Grossi et al, "Suffix Trees and their applications in string algorithms", In. Proceedings of the 1st South American Workshop on String Processing, Sep. 1993, pp. 57-76.

Gupta et al., "Kelips: Building an Efficient and Stable P2P DHT thorough Increased Memory and Background Overhead," 2003 IPTPS, LNCS 2735, pp. 160-169.

Habash, Nizar, "The Use of a Structural N-gram Language Model in Generation-Heavy Hybrid Machine Translation," University of Maryland, Univ. Institute for Advance Computer Studies, Sep. 8, 2004.

"Hatzivassiloglou, V. et al., "Unification-Based Glossing",. 1995, Proc. of the International Joint Conference onArtificial Intelligence, pp. 1382-1389."

Ide, N. and Veronis, J., "Introduction to the Special Issue on Word Sense Disambiguation: The State of the Art", Mar. 1998, Computational Linguistics, vol. 24, Issue 1, pp. 2-40.

Bikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, In Proc. of NLPRS, Tokyo.

"Jelinek, F., "Fast Sequential Decoding Algorithm Using a Stack", Nov. 1969, IBM J. Res. Develop., vol. 13, No. 6, pp. 675-685."

"Jones, K. Sparck, "Experiments in Relevance Weighting of Search Terms", 1979, Information Processing &Management, vol. 15, Pergamon Press Ltd., UK, pp. 133-144."

"Knight et al., "Integrating Knowledge Bases and Statistics in MT," 1994, Proc. of the Conference of the Associationfor Machine Translation in the Americas."

"Knight et al., "Filling Knowledge Gaps in a Broad-Coverage Machine Translation System", 1995, Proc. ofthe14th International Joint Conference on Artificial Intelligence, Montreal, Canada, vol. 2, pp. 1390-1396."

"Knight, K. and Al-Onaizan, Y., "A Primer on Finite-State Software for Natural Language Processing", 1999 (available at http://www.isLedullicensed-sw/carmel)."

Knight, K. and Al-Onaizan, Y., "Translation with Finite-State Devices," Proceedings of the 4th AMTA Conference, 1998.

"Knight, K. and Chander, I., "Automated Postediting of Documents,"1994, Proc. of the 12th Conference on ArtificialIntelligence, pp. 779-784."

Knight, K. and Graehl, J., "Machine Transliteration", 1997, Proc. of the ACL-97, Madrid, Spain, pp. 128-135.

"Knight, K. and Hatzivassiloglou, V., "Two-Level, Many-Paths Generation," D 1995, Proc. of the 33rd AnnualConference of the ACL, pp. 252-260."

"Knight, K. and Luk, S., "Building a Large-Scale Knowledge Base for Machine Translation," 1994, Proc. of the 12thConference on Artificial Intelligence, pp. 773-778."

"Knight, K. and Marcu, D., "Statistics-Based Summarization—Step One: Sentence Compression," 2000, AmericanAssociation for Artificial Intelligence Conference, pp. 703-710."

"Knight, K. and Yamada, K., "A Computational Approach to Deciphering Unknown Scripts," 1999, Proc. of the ACLWorkshop on Unsupervised Learning in Natural Language Processing."

"Knight, Kevin, "A Statistical MT Tutorial Workbook," 1999, JHU Summer Workshop (available at http://www.isLedu/natural-language/mUwkbk.rtf)."

Knight, Kevin, "Automating Knowledge Acquisition for Machine Translation," 1997, AI Magazine 18(4).

"Knight, Kevin, "Connectionist Ideas and Algorithms," Nov. 1990, Communications of the ACM, vol. 33, No. 11, pp. 59-74."

"Knight, Kevin, "Decoding Complexity in Word-Replacement Translation Models", 1999, Computational Linguistics,25(4)."

"Knight, Kevin, "Integrating Knowledge Acquisition and Language Acquisition", May 1992, Journal of AppliedIntelligence, vol. 1, No. 4."

"Knight, Kevin, "Learning Word Meanings by Instruction," 1996, Proc. of the D National Conference on ArtificialIntelligence, vol. 1, pp. 447-454."

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

"Koehn, P. and Knight, K., "ChunkMT: Statistical Machine Translation with Richer Linguistic Knowledge," Apr. 2002,Information Sciences Institution."

"Koehn, P. and Knight, K., "Estimating Word Translation Probabilities from Unrelated Monolingual Corpora Usingthe EM Algorithm," 2000, Proc. of the 17th meeting of the AAAI."

(56) References Cited

OTHER PUBLICATIONS

"Koehn, P. and Knight, K., "Knowledge Sources for Word-Level Translation Models," 2001, Conference on EmpiricalMethods in Natural Language Processing."

"Kumar, R. and Li, H., "Integer Programming Approach to Printed Circuit Board Assembly Time Optimization," 1995,IEEE Transactions on Components, Packaging, and Manufacturing, Part B: Advance Packaging, vol. 18,No. 4. pp. 720-727."

Kupiec, Julian, "An Algorithm for Finding Noun Phrase Correspondecnes in Bilingual Corpora," In Proceedings of the 31st Annual Meeting of the ACL, 1993, pp. 17-22.

"Kurohashi, S. and Nagao, M., "Automatic Detection of Discourse Structure by Checking Surface Information inSentences," 1994, Proc. of COL-LING '94, vol. 2, pp. 1123-1127."

"Langkilde, I. and Knight, K., "Generation that Exploits Corpus-Based Statistical Knowledge," 1998, Proc. of theCOLING-ACL, pp. 704-710."

Shirai, S., "A Hybrid Rule and Example-based Method for Machine Translation," NTT Communication Science Laboratories, pp. 1-5.

"Sumita et al., "A Discourse Structure Analyzer for Japanese Text, 1992, Proc. of the International Conference onFifth Generation Computer Systems," vol. 2, pp. 1133-1140."

Yamamoto et al, "Acquisition of Phrase-level Bilingual Correspondence using Dependency Structure" In Proceedings of COLING-2000, pp. 933-939.

"Bangalore, S. and Rambow, O., "Using TAGs, a Tree Model, and a Language Model for Generation," May 2000,Workshop TAG+5, Paris."

Gale, W. and Church, K., "A Program for Aligning Sentences in Bilingual Corpora," 1993, Computational Linguistics, vol. 19, No. 1, pp. 75-102.

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in CONTRAST—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Mar. 1, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 9, 2013 in Japanese Patent Application 2007-536911 filed Oct. 12, 2005.

Office Action mailed May 13, 2005 in Chinese Patent Application 1812317.1, filed May 11, 2001.

Office Action mailed Apr. 21, 2006 in Chinese Patent Application 1812317.1, filed May 11, 2001.

Office Action mailed Jul. 19, 2006 in Japanese Patent Application 2003-577155, filed Mar. 11, 2003.

Office Action mailed Mar. 1, 2007 in Chinese Patent Application 3805749.2, filed Mar. 11, 2003.

Office Action mailed Feb. 27, 2007 in Japanese Patent Application 2002-590018, filed May 13, 2002.

Office Action mailed Jan. 26, 2007 in Chinese Patent Application 3807018.9, filed Mar. 27, 2003.

Office Action mailed Dec. 7, 2005 in Indian Patent Application 2283/DELNP/2004, filed Mar. 11, 2003.

Office Action mailed Mar. 31, 2009 in European Patent Application 3714080.3, filed Mar. 11, 2003.

Agichtein et al., "Snowball: Extracting Information from Large Plain-Text Collections," ACM DL '00, the Fifth ACM Conference on Digital Libraries, Jun. 2, 2000, San Antonio, TX, USA.

Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.

Office Action mailed Aug. 29, 2006 in Japanese Patent Application 2003-581064, filed Mar. 27, 2003.

Office Action mailed Jan. 26, 2007 in Chinese Patent Application 3807027.8, filed Mar. 28, 2003.

Office Action mailed Jul. 25, 2006 in Japanese Patent Application 2003-581063, filed Mar. 28, 2003.

"Abney, Steven P. , "Parsing by Chunks," 1991, Principle-Based Parsing: Computation and Psycholinguistics, vol. 44,pp. 257-279."

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., "Translating with Scarce Resources," 2000, 17th National Conference of the American Associationfor Artificial Intelligence, Austin, TX, pp. 672-678."

Al-Onaizan, Y. and Knight K., "Machine Transliteration of Names in Arabic Text,"Proceedings of ACL Workshop on Computational Approaches to Semitic Languages. Philadelphia, 2002.

"Al-Onaizan, Y. and Knight, K., "Named Entity Translation: Extended Abstract", 2002, Proceedings of HLT-02, SanDiego, CA."

"Al-Onaizan, Y. and Knight, K., "Translating Named Entities Using Monolingual and Bilingual Resources," 2002, Proc. of the 40th Annual Meeting of the ACL, pp. 400-408."

"Alshawi et al., "Learning Dependency Translation Models as Collections of Finite-State Head Transducers," 2000, Computational Linguistics, vol. 26, pp. 45-60."

Alshawi, Hiyan, "Head Automata for Speech Translation", Proceedings of the ICSLP 96, 1996, Philadelphia, Pennsylvania.

"Arbabi et al., "Algorithms for Arabic name transliteration," Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information,"SIGIR 97, Philadelphia, PA, © 1997, pp. 84-91.

"Bangalore, S. and Rambow, 0., "Evaluation Metrics for Generation," 2000, Proc. of the 1st International NaturalLanguage Generation Conf., vol. 14, pp. 1-8."

(56) References Cited

OTHER PUBLICATIONS

"Bangalore, S. and Rambow, O., "Using TAGs, a Tree Model, and a Language Model for Generation," May 2000,Workshop TAG+5, Paris."

"Bangalore, S. and Rambow, O., "Corpus-Based Lexical Choice in Natural Language Generation," 2000, Proc. ofthe 38th Annual ACL, Hong Kong, pp. 464-471."

"Bangalore, S. and Rambow, O., "Exploiting a Probabilistic Hierarchical Model for Generation," 2000, Proc. of 18thconf. on Computational Linguistics, vol. 1, pp. 42-48."

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

"Barnett et al., "Knowledge and Natural Language Processing,"Aug. 1990, Communications of the ACM, vol. 33,Issue 8, pp. 50-71."

"Baum, Leonard, "An Inequality and Associated Maximization Technique in Statistical Estimation for ProbabilisticFunctions of Markov Processes", 1972, Inequalities 3:1-8."

Berhe, G. et al., "Modeling Service-baed Multimedia Content Adaptation in Pervasive Computing," CF '04 (Ischia, Italy) Apr. 14-16, 2004, pp. 60-69.

Boitet, C. et al., "Main Research Issues in Building Web Services," Proc. Of the 6th Symposium on Natural Language Processing, Human and Computer Processing of Language and Speech, © 2005, pp. 1-11.

"Brants, Thorsten, "TnT—A Statistical Part-of-Speech Tagger," 2000, Proc. of the 6th Applied Natural LanguageProcessing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

"Brill, Eric. "Transformation-Based Error-Driven Learning and Natural Language Processing: A Case Study in Partof Speech Tagging",1995, Computational Linguistics, vol. 21, No. 4, pp. 543-565."

"Brown et al., "A Statistical Approach to Machine Translation," Jun. 1990, Computational Linguistics, vol. 16, No. 2, pp. 79-85."

Brown et al., "Word-Sense Disambiguation Using Statistical Methods," 1991, Proc. of 29th Annual ACL, pp. 264-270.

"Brown et al., "The Mathematics of Statistical Machine Translation: Parameter Estimation," 1993, ComputationalLinguistics, vol. 19, Issue 2, pp. 263-311."

"Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118."

"Callan et al., "TREC and TIPSTER Experiments with INQUERY," 1994, Information Processing and Management,vol. 31, Issue 3, pp. 327-343."

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

"Carl, Michael. "A Constructivist Approach to Machine Translation," 1998, New Methods of Language Processingand Computational Natural Language Learning, pp. 247-256."

"Chen, K. and Chen, H., "Machine Translation: An Integrated Approach," 1995, Proc. of 6th Int'l Cont. on Theoreticaland Methodological Issue in MT, pp. 287-294."

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

"Clarkson, P. and Rosenfeld, R., "Statistical Language Modeling Using the CMU-Cambridge Toolkit", 1997, Proc. ESCA Eurospeech, Rhodes, Greece, pp. 2707-2710."

Cohen et al., "Spectral Bloom Filters," SIGMOD 2003, Jun. 9-12, 2003, ACM pp. 241-252.

Cohen, "Hardware-Assisted Algorithm for Full-text Large-dictionary String Matching Using n-gram Hashing," 1998, Information Processing and Management, vol. 34, No. 4, pp. 443-464.

Cohen, Yossi, "Interpreter for FUF," (available at ftp:/lftp.cs.bgu.ac.il/ pUb/people/elhadad/fuf-life.lf), 2008.

"Corston-Oliver, Simon, "Beyond String Matching and Cue Phrases: Improving Efficiency and Coverage inDiscourse Analysis", 1998, The AAAI Spring Symposium on Intelligent Text Summarization, pp. 9-15."

Covington, "An Algorithm to Align Words for Historical Comparison", Computational Linguistics, 1996, 22(4), pp. 481-496.

"Dagan, I. and Itai, A., "Word Sense Disambiguation Using a Second Language Monolingual Corpus", 1994, Association forComputational Linguistics, vol. 20, No. 4, pp. 563-596."

"Dempster et al., "Maximum Likelihood from Incomplete Data via the EM Algorithm", 1977, Journal of the RoyalStatistical Society, vol. 39, No. 1, pp. 1-38."

"Diab, M. and Finch, S., "A Statistical Word-Level Translation Model for Comparable Corpora," 2000, In Proc.of theConference on Content Based Multimedia Information Access (RIAO)."

"Diab, Mona, "An Unsupervised Method for Multilingual Word Sense Tagging Using Parallel Corpora: APreliminary Investigation", 2000, SIGLEX Workshop on Word Senses and Multi-Linguality, pp. 1-9."

Elhadad et al., "Floating Constraints in Lexical Choice", 1996, ACL, 23(2): 195-239.

"Elhadad, M. and Robin, J., "An Overview of SURGE: a Reusable Comprehensive Syntactic RealizationComponent," 1996, Technical Report 96-03, Department of Mathematics and Computer Science, Ben GurionUniversity, Beer Sheva, Israel."

Elhadad, M. and Robin, J., "Controlling Content Realization with Functional Unification Grammars", 1992, Aspects of Automated Natural Language Generation, Dale et al. (eds)., Springer Verlag, pp. 89-104.

"Elhadad, Michael, "FUF: the Universal Unifier User Manual Version 5.2", 1993, Department of Computer Science,Ben Gurion University, Beer Sheva, Israel."

"Langkilde, I. and Knight, K., "The Practical Value of N-Grams in Generation," 1998, Proc. of the 9th InternationalNatural Language Generation Workshop, pp. 248-255."

"Langkilde, Irene, "Forest-Based Statistical Sentence Generation," 2000, Proc. of the 1st Conference on NorthAmerican chapter of the ACL, Seattle, WA, pp. 170-177."

"Langkilde-Geary, Irene, "A Foundation for General-Purpose Natural Language Generation: SentenceRealization Using Probabilistic Models of Language," 2002, Ph.D. Thesis, Faculty of the Graduate School, Universityof Southern California."

"Langkilde-Geary, Irene, "An Empirical Verification of Coverage and Correctness for a General-PurposeSentence Generator," 1998, Proc. 2nd Int'l Natural Language Generation Conference."

"Lee-Y.S.,"Neural Network Approach to Adaptive Learning: with an Application to Chinese HomophoneDisambiguation," IEEE pp. 1521-1526", Jul. 2001.

Lita, L., et al., "tRuEcasing," Proceedings of the 41st Annual Meeting of the Assoc. for Computational Linguistics (In Hinrichs, E. and Roth, D.—editors), pp. 152-159, Jul. 2003.

Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.

"Mann, G. and Yarowsky, D., "Multipath Translation Lexicon Induction via Bridge Languages," 2001, Proc. of the2nd Conference of the North American Chapter of the ACL, Pittsburgh, PA, pp. 151-158."

(56) References Cited

OTHER PUBLICATIONS

"Manning, C. and Schutze, H., "Foundations of Statistical Natural Language Processing," 2000, The MIT Press, Cambridge, MA [redacted]."

"Marcu, D. and Wong, W., "A Phrase-Based, Joint Probability Model for Statistical Machine Translation," 2002, Proc.of ACL-2 conference on Empirical Methods in Natural Language Processing, vol. 10, pp. 133-139."

"Marcu, Daniel, "Building Up Rhetorical Structure Trees," 1996, Proc. of the National Conference on ArtificialIntelligence and Innovative Applications of Artificial Intelligence Conference, vol. 2, pp. 1069-1074."

"Marcu, Daniel, "Discourse trees are good indicators of importance in text," 1999, Advances in Automatic TextSummarization, The MIT Press, Cambridge, MA."

"Marcu, Daniel, "Instructions for Manually Annotating the Discourse Structures of Texts," 1999, DiscourseAnnotation, pp. 1-49."

"Marcu, Daniel, "The Rhetorical Parsing of Natural Language Texts," 1997, Proceedings of ACLIEACL '97, pp. 96-103."

"Marcu, Daniel, "The Rhetorical Parsing, Summarization, and Generation of Natural Language Texts," 1997, Ph. D.Thesis, Graduate Department of Computer Science, University of Toronto."

"Marcu, Daniel, "Towards a Unified Approach to Memory- and Statistical-Based Machine Translation," 2001, Proc.of the 39th Annual Meeting of the ACL, pp. 378-385."

McCallum A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

"Melamed, I. Dan, "A Word-to-Word Model of Translational Equivalence," 1997, Proc. of the 35th Annual Meeting ofthe ACL, Madrid, Spain, pp. 490-497."

"Melamed, I. Dan, "Automatic Evaluation and Uniform Filter Cascades for Inducing N-Best Translation Lexicons,"1995, Proc. of the 3rd Workshop on Very Large Corpora, Boston, MA, pp. 184-198."

"Melamed, I. Dan, "Empirical Methods for Exploiting Parallel Texts," 2001, MIT Press, Cambridge, MA [table ofcontents]."

"Meng et al.. "Generating Phonetic Cognates to Handle Named Entities in English-Chinese Cross-LanguageSpoken Document Retrieval," 2001, IEEE Workshop on Automatic Speech Recognition and Understanding. pp. 311-314."

Metze, F. et al., "The NESPOLE! Speech-to-Speech Translation System," Proc. of the HLT 2002, 2nd Int'l Conf. on Human Language Technology (San Francisco, CA), © 2002, pp. 378-383.

"Mikheev et al., "Named Entity Recognition without Gazeteers," 1999, Proc. of European Chapter of the ACL, Bergen,Norway, pp. 1-8."

"Miike et al., "A full-text retrieval system with a dynamic abstract generation function," 1994, Proceedings of SI-GIR'94, pp. 152-161."

"Mohri, M. and Riley, M., "An Efficient Algorithm for the N-Best-Strings Problem," 2002, Proc. of the 7th Int. Conf. onSpoken Language Processing (ICSLP'02), Denver, CO, pp. 1313-1316."

Mohri, Mehryar, "Regular Approximation of Context Free Grammars Through Transformation", 2000, pp. 251-261, "Robustness in Language and Speech Technology", Chapter 9, Kluwer Academic Publishers.

"Monasson et al., "Determining computational complexity from characteristic 'phase transitions'," Jul. 1999, NatureMagazine, vol. 400, pp. 133-137."

"Mooney, Raymond, "Comparative Experiments on Disambiguating Word Senses: An Illustration of the Role of Biasin Machine Learning," 1996, Proc. of the Conference on Empirical Methods in Natural Language Processing, pp. 82-91."

Nagao, K. et al., "Semantic Annotation and Transcoding: Making Web Content More Accessible," IEEE Multimedia, vol. 8, Issue 2 Apr.-Jun. 2001, pp. 69-81.

"Nederhof, M. and Satta, G., "IDL-Expressions: A Formalism for Representing and Parsing Finite Languages inNatural Language Processing," 2004, Journal of Artificial Intelligence Research, vol. 21, pp. 281-287."

"Niessen,S. and Ney, H, "Toward hierarchical models for statistical machine translation of inflected languages," 2001,Data-Driven Machine Translation Workshop, Toulouse, France, pp. 47-54."

Norvig, Peter, "Techniques for Automatic Memoization with Applications to Context-Free Parsing", Compuational Linguistics,1991, pp. 91-98, vol. 17, No. 1.

"Och et al., "Improved Alignment Models for Statistical Machine Translation," 1999, Proc. of the Joint Conf. ofEmpirical Methods in Natural Language Processing and Very Large Corpora, pp. 20-28."

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI=http://dx.doi.org/10.3115/1075096.

"Och, F. and Ney, H, "Improved Statistical Alignment Models," 2000, 38th Annual Meeting of the ACL, Hong Kong, pp. 440-447."

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Och, F. and Ney, H., "A Systematic Comparison of Various Statistical Alignment Models," Computational Linguistics, 2003, 29:1, 19-51.

"Papineni et al., "Bleu: a Method for Automatic Evaluation of Machine Translation," 2001, IBM Research Report, RC22176(WQ102-022)."

Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.

"Pla et al., "Tagging and Chunking with Bigrams," 2000, Proc. of the 18th Conference on Computational Linguistics, vol. 2, pp. 614-620."

Qun, Liu, "A Chinese-English Machine Translation System Based on Micro-Engine Architecture," An Int'l. Conference on Translation and Information Technology, Hong Kong, Dec. 2000, pp. 1-10.

Rapp, Reinhard, Automatic Identification of Word Translations from Unrelated English and German Corpora, 1999, 37th Annual Meeting of the ACL, pp. 519-526.

"Rapp, Reinhard, "Identifying Word Translations in Non-Parallel Texts," 1995, 33rd Annual Meeting of the ACL, pp. 320-322."

Rayner et al.,"Hybrid Language Processing in the Spoken Language Translator," IEEE, pp. 107-110, Apr. 1997.

"Resnik, P. and Smith, A., "The Web as a Parallel Corpus," Sep. 2003, Computational Linguistics, SpecialIssue on Web as Corpus, vol. 29, Issue 3, pp. 349-380."

"Resnik, P. and Yarowsky, D. "A Perspective on Word Sense Disambiguation Methods and Their Evaluation," 1997, Proceedings of SIGLEX '97, Washington, D.C., pp. 79-86."

"Resnik, Philip, "Mining the Web for Bilingual Text," 1999, 37th Annual Meeting of the ACL, College Park, MD, pp. 527-534."

Rich, E. and Knight, K., "Artificial Intelligence, Second Edition," 1991, McGraw-Hili Book Company [redacted].

"Richard et al., "Visiting the Traveling Salesman Problem with Petri nets and application in the glass industry," Feb. 1996, IEEE Emerging Technologies and Factory Automation, pp. 238-242."

"Robin, Jacques, "Revision-Based Generation of Natural Language Summaries Providing Historical Background: Corpus-Based Analysis, Design Implementation and Evaluation," 1994, Ph.D. Thesis, Columbia University, New York."

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

"Russell, S. and Norvig, P., "Artificial Intelligence: A Modern Approach," 1995, Prentice-Hall, Inc., New Jersey [redacted—table of contents]."

(56) References Cited

OTHER PUBLICATIONS

"Sang, E. and Buchholz, S., "Introduction to the CoNLL-2000 Shared Task: Chunking," 20002, Proc. ofCoNLL-2000 and LLL-2000, Lisbon, Portugal, pp. 127-132."

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

"Schutze, Hinrich, "Automatic Word Sense Discrimination," 1998, Computational Linguistics, Special Issue on WordSense Disambiguation, vol. 24, Issue 1, pp. 97-123."

"Selman et al., "A New Method for Solving Hard Satisfiability Problems," 1992, Proc. of the 10th National Conferenceon Artificial Intelligence, San Jose, CA, pp. 440-446."

Kumar, S. and Byrne, W., "Minimum Bayes-Risk Decoding for Statistical Machine Translation." HLTNAACL Conference. Mar. 2004, 8 pages.

"Shapiro, Stuart (ed.), "Encyclopedia of Artificial Intelligence, 2nd edition", vol. D 2,1992, John Wiley & Sons Inc;"Unification" article, K. Knight, pp. 1630-1637."

Shirai, S., "A Hybrid Rule and Example-based Method for Machine Translation," NTT Communication Science Laboratories, pp. 1-5, 1997.

"Sobashima et al., "A Bidirectional Transfer-Driven Machine Translation System for Spoken Dialogues," 1994, Proc.of 15th Conference on Computational Linguistics, vol. 1, pp. 64-68."

"Soricut et al., "Using a large monolingual corpus to improve translation accuracy," 2002, Lecture Notes in Computer Science, vol. 2499, Proc. of the 5th Conference of the Association for Machine Translation in theAmericas on Machine Translation: From Research to Real Users, pp. 155-164."

"Stalls, B. and Knight, K., "Translating Names and Technical Terms in Arabic Text," 1998, Proc. of the COLING/ACL Workkshop on Computational Approaches to Semitic Language."

"Sumita et al., "A Discourse Structure Analyzer for Japanese Text," 1992, Proc. of the International Conference onFifth Generation Computer Systems, vol. 2, pp. 1133-1140."

"Sun et al., "Chinese Named Entity Identification Using Class-based Language Model," 2002, Proc. of 19thInternational Conference on Computational Linguistics, Taipei, Taiwan, vol. 1, pp. 1-7."

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.

"Taylor et al., "The Penn Treebank: An Overview," in A. Abeill (ed.), D Treebanks: Building and Using ParsedCorpora, 2003, pp. 5-22."

"Tiedemann, Jorg, "Automatic Construction of Weighted String Similarity Measures," 1999, In Proceedings ofthe Joint SIGDAT Conference on Emperical Methods in Natural Language Processing and Very Large Corpora."

"Tillman, C. and Xia, F., "A Phrase-Based Unigram Model for Statistical Machine Translation," 2003, Proc. of theNorth American Chapter of the ACL on Human Language Technology, vol. 2, pp. 106-108."

"Tillmann et al., "A DP based Search Using Monotone Alignments in Statistical Translation," 1997, Proc. of theAnnual Meeting of the ACL, pp. 366-372."

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114.

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

"Ueffing et al., "Generation of Word Graphs in Statistical Machine Translation," 2002, Proc. of Empirical Methods inNatural Language Processing (EMNLP), pp. 156-163."

Varga et al, "Parallel corpora for medium density languages", In Proceedings of RANLP 2005, pp. 590-596.

"Veale, T. and Way, A., "Gaijin: A Bootstrapping, Template-Driven Approach to Example-Based MT," 1997, Proc. ofNew Methods in Natural Language Processing (NEMPLP97), Sofia, Bulgaria."

Vogel et al., "The CMU Statistical Machine Translation System," 2003, Machine Translation Summit IX, New Orleans, LA.

"Vogel et al., "The Statistical Translation Module in the Verbmobil System," 2000, Workshop on Multi-Lingual SpeechCommunication, pp. 69-74."

"Vogel, S. and Ney, H., "Construction of a Hierarchical Translation Memory," 2000, Proc. of Cooling 2000, Saarbrucken, Germany, pp. 1131-1135."

"Wang, Y. and Waibel, A., "Decoding Algorithm in Statistical Machine Translation," 1996, Proc. of the 35th AnnualMeeting of the ACL, pp. 366-372."

"Wang, Ye-Yi, "Grammar Inference and Statistical Machine Translation," 1998, Ph.D Thesis, Carnegie MellonUniversity, Pittsburgh, PA."

"Watanabe et al., "Statistical Machine Translation Based on Hierarchical Phrase Alignment," 2002, 9th InternationalConference on Theoretical and Methodological Issues in Machin Translation (TMI-2002), Keihanna, Japan, pp. 188-198."

"Witbrock, M. and Mittal, V., "Ultra-Summarization: A Statistical Approach to Generating Highly Condensed Non-Extractive Summaries," 1999, Proc. of SIGIR '99, 22nd International Conference on Research and Development inInformation Retrieval, Berkeley, CA, pp. 315-316."

"Wu, Dekai, "A Polynomial-Time Algorithm for Statistical Machine Translation," 1996, Proc. of 34th Annual Meeting ofthe ACL, pp. 152-158."

"Wu, Dekai, "Stochastic Inversion Transduction Grammars and Bilingual Parsing of Parallel Corpora," 1997, Computational Linguistics, vol. 23, Issue 3, pp. 377-403."

"Yamada, K. and Knight, K. "A Syntax-based Statistical Translation Model," D 2001, Proc. of the 39th AnnualMeeting of the ACL, pp. 523-530."

"Yamada, K. and Knight, K., "A Decoder for Syntax-based Statistical MT," 2001, Proceedings of the 40th AnnualMeeting of the ACL, pp. 303-310."

Yamada K., "A Syntax-Based Statistical Translation Model," 2002 PhD Dissertation, pp. 1-141.

"Yamamoto et al., "A Comparative Study on Translation Units for Bilingual Lexicon Extraction," 2001, JapanAcademic Association for Copyright Clearance, Tokyo, Japan."

Yamamoto et al, "Acquisition of Phrase-level Bilingual Correspondence using Dependency Structure" In Proceedings of COLING-2000, pp. 933-939, 2000.

"Yarowsky, David, "Unsupervised Word Sense Disambiguation Rivaling Supervised Methods," 1995, 33rd AnnualMeeting of the ACL, pp. 189-196."

Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

"Patent Cooperation Treaty International Preliminary Report on Patentability and the Written Opinion, Internationalapplication No. PCT/US2008/004296, Oct. 6, 2009, 5 pgs."

Document, Wikipedia.com, web.archive.org (Feb. 24, 2004) <http://web.archive.org/web/20040222202831 /http://en.wikipedia.org/wikiiDocument>, Feb, 24, 2004.

Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.reference.com/browse/identifying>.

(56) References Cited

OTHER PUBLICATIONS

Koehn, P., et al, "Statistical Phrase-Based Translation," Proceedings of HLT-NAACL 2003 Main Papers, pp. 48-54 Edmonton, May-Jun. 2003.

Abney, S.P., "Stochastic Attribute Value Grammars", Association for Computional Linguistics, 1997, pp. 597-618.

Notice of Allowance mailed Dec. 10, 2013 in Japanese Patent Application 2007-536911, filed Oct. 12, 2005.

Makoushina, J. "Translation Quality Assurance Tools: Current State and Future Approaches." Translating and the Computer, 29, 1-39, retrieved at <<http://www.palex.ru/fc/98/Translation%20Quality%Assurance%20Tools.pdf>>, Nov. 2007.

Specia et al. "Improving the Confidence of Machine Translation Quality Estimates," MT Summit XII, Ottawa, Canada, 2009, 8 pages.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation" <URL: http://acl.ldc.upenn.edu/J/J03/J03-1005.pdf>, 2003.

Wang, W., et al. "Capitalizing Machine Translation" in HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.

\* cited by examiner

US 8,825,466 B1

MODIFICATION OF ANNOTATED BILINGUAL SEGMENT PAIRS IN SYNTAX-BASED MACHINE TRANSLATION

GOVERNMENT INTERESTS

The research and development described in this application were partially supported by the Defense Advanced Research Projects Agency (DARPA), Contract No. HR0011-06-C-0022 and by the Advanced Technology Program (ATP) at the National Institute of Standards and Technology (NIST), Project No. 00-00-6945. The U.S. government may have certain rights in the claimed inventions.

BACKGROUND

1. Field of the Invention

The invention disclosed herein is generally related to machine translation and more specifically to modification of annotated bilingual segment pairs in syntax-based machine translation.

2. Description of the Related Art

To translate written documents from a source language, such as Arabic, to a target language, such as English, machine translation performed by a computer may be used. One technique, statistical machine translation, used to perform machine translation includes generating a translation model comprising translation rules derived from phrases in the source language matched with phrases in the target language These paired phrases include annotated bilingual segment pairs. The annotated bilingual segment pair may be a sentence, a fragment, or a phrase.

In a string-to-tree annotated bilingual segment pair, the target phrase may be represented as a tree having branches separating syntactic structures in the target phrase. The nodes of the tree are typically labeled based on the syntactic structure of the branch. Syntactic structures include noun phrases, verb phrases, adverb phrases, or the like. The annotated bilingual segment pair may further include alignments between the words in the source language and words in the target language.

FIG. 1 is a diagram of a prior art process 100 for deriving translation rules from an annotated bilingual segment pair. The process 100 comprises, in a single iteration, receiving the annotated bilingual segment pair 102 and training a translation engine based on the annotated bilingual segment pair 102 to generate composed rules 104. The composed rules 104 may be used by the translation engine to translate a document from the source language to the target language.

The annotated bilingual segment pair 102 is a tree-to-string annotated bilingual segment pair and comprises one or more parent nodes that are each associated with at least two children. The children may, in turn, be parent nodes for other children. Each node is labeled with a syntactic structure identifier such as noun phrase (NP), verb phrase (VP), adverb phrase (ADVP), or the like. Each endpoint comprises a word in a target language, designated in FIG. 1 by the letter "a." In the annotated bilingual segment pair 102, words in a target phrase designated by the letter "e" are each aligned via a dotted line to one or more words in the target phrase.

The annotations on a bilingual segment pair are generated automatically by a machine and may include inaccurate or imprecise labels, structures, and/or alignments. In machine translation, millions of the annotated bilingual segment pairs may be used and it may be impractical to correct each of the annotated bilingual segment pairs manually. Further, poor annotated bilingual segment pairs may result in translations that are not comprehensible, nonsensical, or awkward.

SUMMARY

Systems and methods for correcting an annotated bilingual segment pair are provided. In a method according to one embodiment, an annotated bilingual segment pair is received. The annotated bilingual segment pair is processed to generate a plurality of trees based on a tree or set of alignments in the annotated bilingual segment pair. From the plurality of trees, rule sequences are derived. The rule sequences are then processed using an expectation-maximization algorithm to select one of the rule sequences that is most likely to result in an accurate and fluent translation of the source phrase. A second annotated bilingual segment pair based on the selected rule sequence is generated.

DETAILED DESCRIPTION

In machine translation, annotated bilingual segment pairs are used to generate translation rules. The translation rules can then be used to translate documents from a source language to a target language. The translation rules are generated from the annotated bilingual segment pairs using a training process. Translation rules may comprise composed rules and/or minimal rules, as is known in the art. Systems and methods for modifying an annotated bilingual segment pair are presented.

The modification of the annotated bilingual segment pair may comprise re-labeling the syntactic structures in the annotated bilingual segment pair, re-structuring the nodes in the annotated bilingual segment pair, and/or re-aligning words in a source phrase to words in a target phrase. To modify the annotated bilingual segment pair, the annotated bilingual segment pair is processed to generate a plurality of trees. Each tree represents a possible modification of the annotated bilingual segment pair. Any number of trees may be generated. A set of rule sequences used to explain each tree is derived. From the derived rule sequences, one of the derived rule sequences is selected using an expectation-maximization algorithm. The expectation-maximization algorithm calculates a probability that a derived rule sequence is correct for any given translation and then compares the probability to the other probabilities associated with the other derived rule sequences. Based on the comparison, the derived rule sequence having the highest probability of generating the correct translation is selected.

Using the selected rule sequence, a new annotated bilingual segment pair is generated for the source phrase and the target phrase. The new annotated bilingual segment pair is based on the rule sequence having the highest probability, as discussed herein. The new annotated bilingual segment pair may be used to generate a translation rule and/or train a translation engine as part of a larger set of annotated bilingual segment pairs.

Figure 1:
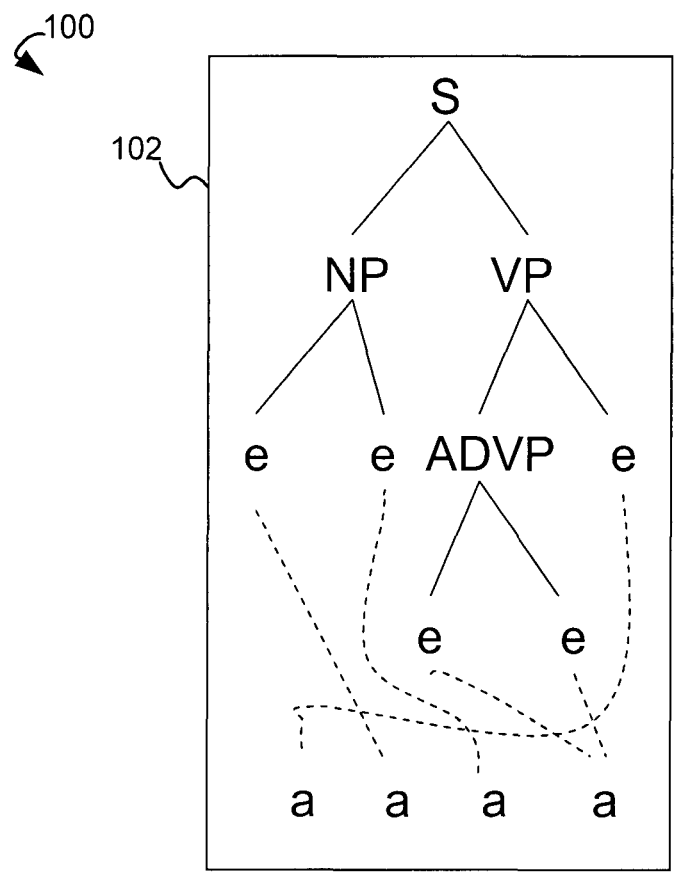
FIG. 1 is a diagram of a prior art process for deriving translation rules from an annotated bilingual segment pair.
Figure 1:
Figure 2:
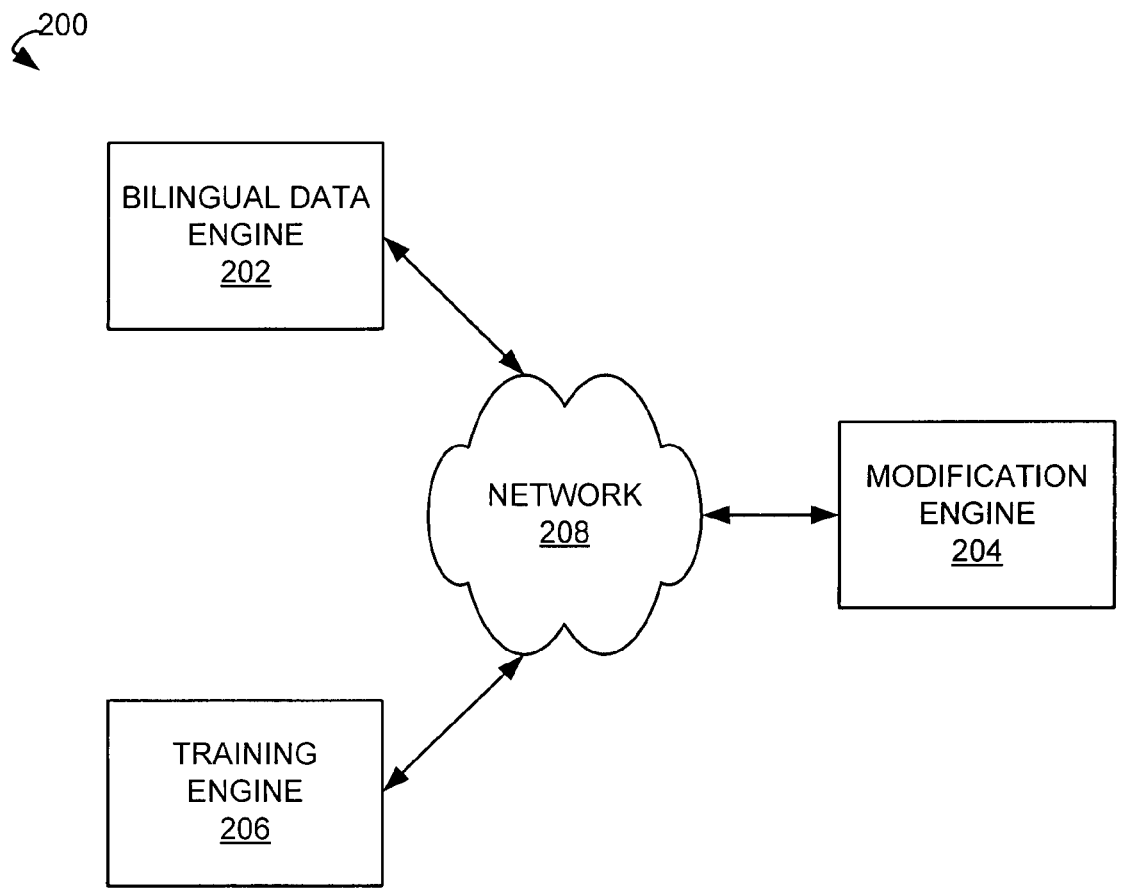
FIG. 2 depicts an environment in which various embodiments may be practiced.

FIG. 2 depicts an environment 200 in which various embodiments may be practiced. The environment 200 may comprise a bilingual engine, or bilingual data engine 202, a modification engine 204, and a training engine 206 configured to communicate over a network 208. The network 208 may comprise a public or private network such as a local area network (LAN), a wide area network (WAN), or the Internet. The bilingual data engine 202, the modification engine 204, and the training engine 206 may be implemented in hardware, software, or any combination thereof as is known to those skilled in the art.

The bilingual data engine 202 is configured to receive and store bilingual data. In some embodiments, the bilingual data engine 202 is configured to receive pairs of source phrases and target phrases that are translations of one another. The bilingual data engine 202 may process the bilingual data to generate annotated bilingual segment pairs or other data structures that can be used to translate documents including, but not limited to, translation memories, context databases, dictionaries, or the like. According to various embodiments, the annotated bilingual segment pairs may be tree-to-string, tree-to-tree, and/or string-to-tree. The bilingual data engine 202 may communicate the bilingual data to the training engine 206.

The modification engine 204 may be configured to receive the bilingual data and process the bilingual data to generate a modified annotated bilingual segment pair that can be used by the training engine 206 to generate translation rules. The modification engine 204 is configured to re-label, re-structure, and/or re-align a previously generated annotated bilingual segment pair. The modification engine 204 may receive the annotated bilingual segment pair from the bilingual data engine 202, modify the annotated bilingual segment pair, and output a modified annotated bilingual segment pair to the bilingual engine 202 and/or the training engine 206. The modification engine 204 is discussed in greater detail herein in connection with, at least, FIG. 3.

The training engine 206 is configured to receive the modified annotated bilingual segment pair, compose translation rules, and output the translation rules. The translation rules may be composed according to systems and methods known to those skilled in the art and may comprise composed rules and/or minimal rules. The translation rules, according to some embodiments, may be generated using systems and methods similar to those used by the modification engine 204 to generate derived rules.

Figure 3:
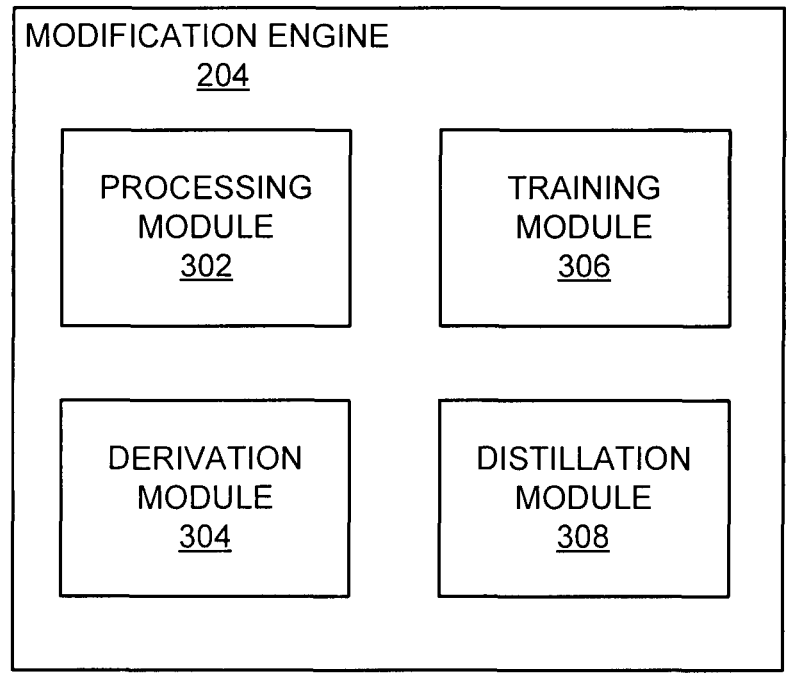
FIG. 3 is a block diagram of a modification engine according to various embodiments.

FIG. 3 is a block diagram of a modification engine 204 according to various embodiments. The modification engine 204 comprises a processing module 302, a derivation module 304, a training module 306, and a distillation module 308. The modules may be implemented as hardware, software, and/or firmware as known to those skilled in the art.

The processing module 302 is configured to receive an annotated bilingual segment pair and process the annotated bilingual segment pair. As a result of the processing, a plurality of trees is generated. In some embodiments, the plurality of trees is generated as a target forest as further described herein, at least, in connection with FIG. 4. The trees in the plurality of trees each represent an alternative annotated bilingual segment pair or alignment rule sequence that can be used to express a relationship between the words in the bilingual segment pair. As part of the processing, the processing module 302 may re-label, re-structure, and/or re-align the annotated bilingual segment pair. Re-labeling the annotated bilingual segment pair includes changing the labels at one or more of the nodes in the tree. Re-structuring includes adding parent nodes to the tree. In some embodiments, the tree may be binarized. Re-aligning the annotated bilingual segment pair includes generating translation rules based on the initial alignments in the annotated bilingual segment pair.

The derivation module 304 is configured to derive a derivation forest from the target forest. The target forest comprises the plurality of trees represented as a single large tree that can be decoded to derive rule sequences. Each tree in the derivation forest comprises a set of rule sequences derived from a tree in the target forest. The derived rule sequences may be generated according to an extraction algorithm adapted to receive a target forest instead of a tree as is apparent to those skilled in the art and as discussed herein in connection with, at least, FIG. 4.

The training module 306 is configured to select one of the derived rule sequences in the derivation forest based on a probability, such as a probability that the derived rule sequence may likely result in a more accurate translation than the other rule sequences in the derivation forest. The selection may be made based on an expectation-maximization algorithm.

The distillation module 308 is configured to distill a modified annotated bilingual segment pair from the selected rule sequence. The modified annotated bilingual segment pair may be utilized to produce a translation rule used to translate documents. The translation rules that are derived from the modified annotated bilingual segment pairs are thus more likely, when combined with other translation rules from other annotated bilingual segment pairs, to result in more accurate or fluent translations in the machine translation system. Although the modification engine 204 is illustrated as having the processing module 302, the derivation module 304, the training module 306, and the distillation module 308, fewer or more modules may comprise the modification engine 204 and still fall within the scope of various embodiments.

Figure 4:
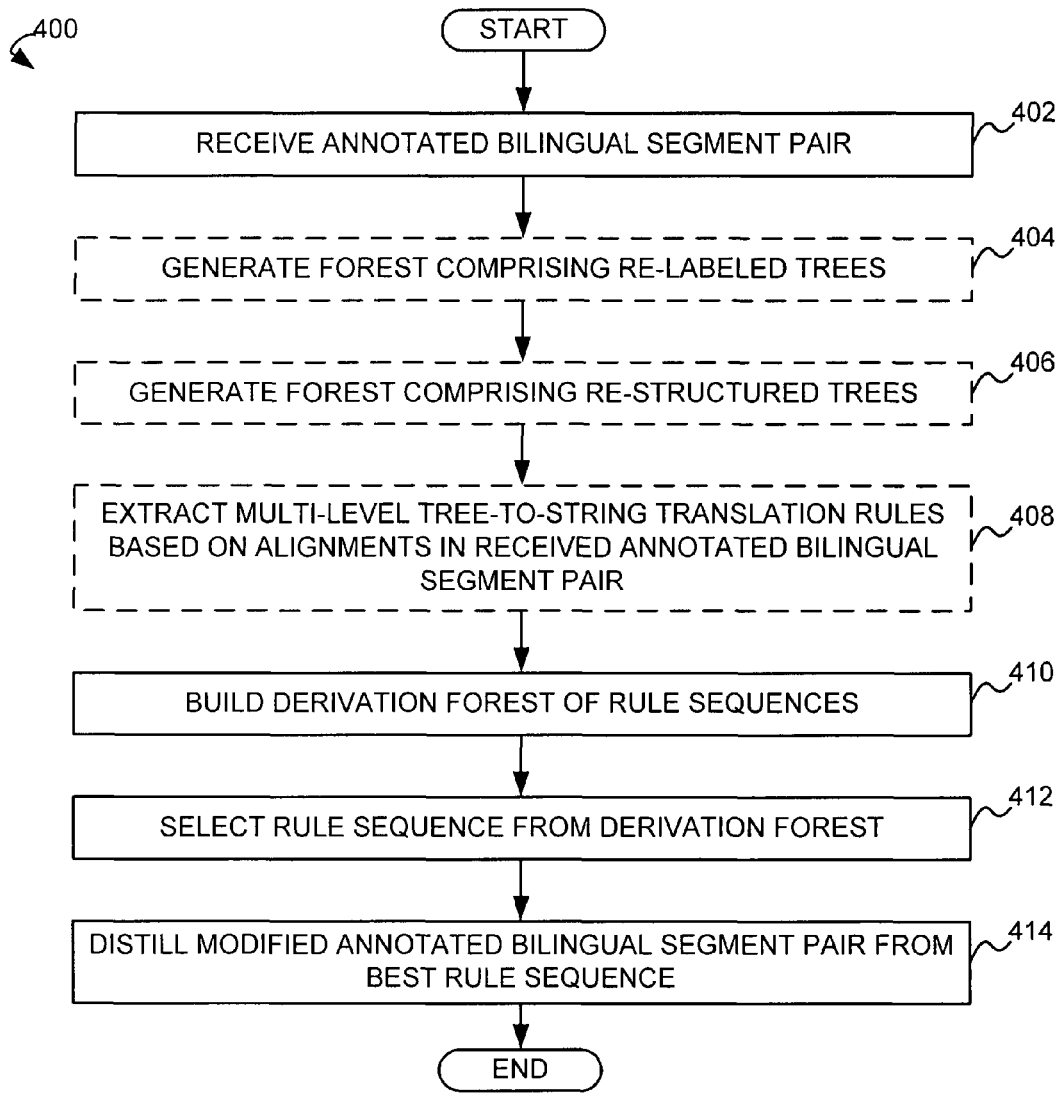
FIG. 4 is a flowchart of an exemplary process for modifying annotated bilingual segment pairs according to various embodiments.

FIG. 4 is a flowchart of an exemplary process 400 for modifying annotated bilingual segment pairs according to various embodiments. The process 400 may be performed by the modification engine 204, according to some embodiments. For the sake of illustration, the process 400 includes sub-processes for re-labeling, re-structuring, and re-aligning the annotated bilingual segment pair. It is understood that various embodiments may comprise performing any combination comprising one or more of these sub-processes. According to some embodiments, the actual combination and order may be previously selected by a user. Further, the process 400 may be performed multiple times using a different sub-process or combination of sub-processes each time. The process 400 begins when an annotated bilingual segment pair is received in an exemplary step 402.

In an exemplary optional step 404, if the annotated bilingual segment pair is re-labeled, a forest comprising re-labeled trees is generated. Re-labeling comprises combining two or more types of syntactic categories into one category and/or dividing a syntactic category into two or more syntactic categories. According to exemplary embodiments, step 404 may be performed multiple times to generate a plurality of the re-labeled trees. Each of the re-labeled trees is associated with a separate set of syntactic category combinations and/or divisions. In some embodiments, the target tree may be re-labeled according to a technique as discussed herein in connection with, at least, FIG. 5. The plurality of re-labeled trees may be generated as a target forest as described herein in connection with, at least, FIG. 7 and as will be apparent to those skilled in the art.

In an exemplary optional step 406, a forest comprising re-structured trees may be generated from the target tree. Re-structuring may be performed by generating new parent nodes to the target tree. In some embodiments, only one new parent node will be formed at a time. In some embodiments, the target tree may be re-structured according to a binarization technique as discussed herein in connection with, at least, FIG. 6.

In the step 406, to generate a forest, a parallel binarization technique may be used. The forest comprises additive forest nodes and multiplicative forest nodes. A multiplicative node corresponds to a tree node in an unbinarized tree. The multiplicative node may then generate two or more additive nodes corresponding to the nodes in the unbinarized tree. The additive nodes may further comprise a leaf in the binarized tree and/or a multiplicative node. A forest generated using a parallel binarization technique is further discussed herein in connection with, at least, FIG. 7.

In an exemplary optional step 408, to re-align the annotated bilingual segment pair, multi-level tree-to-string translation rules are extracted based on the alignments in the received annotated bilingual segment pair. Extracting the translation rules is discussed further herein in connection with, at least, FIG. 8.

In an exemplary step 410, a derivation forest of rule sequences is built. The derivation forest may be built according to various techniques based on the combination of re-labeling, restructuring, and/or re-aligning techniques that are performed. A derivation forest comprises a plurality of rule sequences represented as trees that correspond to the target forest and/or the extracted translation rules.

If re-labeling and/or re-structuring are performed, the rule sequences may be extracted from the target forest. A forest-based extraction algorithm is configured to receive a target forest, a source string, and an alignment and output a derivation forest comprising translation rules.

In exemplary embodiments, the forest-based extraction algorithm is configured to act on two conditions. In a first condition, if an additive target forest node is reached, the multiplicative target forest nodes that are children of the additive node are processed to recursively extract rules according to a second condition to generate multiplicative derivation forest nodes. The new multiplicative derivative forest nodes are children of the additive derivative forest nodes.

In the second condition, if a multiplicative derivative forest node is reached, rules may be extracted. In some embodiments, the rules may be extracted according to the techniques disclosed in Galley et al. "Scalable Inference and Training of Context Rich Syntactic Models." Proceedings of the 44$^{th}$ Annual Meeting of the Association for Computational Linguistics (ACL) 2006. After the rules are extracted, the process returns to condition 1 to form a derivation forest based on the nodes of the newly-extracted rules to generate additive derivation forest nodes.

If re-aligning is performed, the rule sequences may be extracted from the initial alignments in exemplary step 408. Thus, in exemplary step 410, the derivation forest may be constructed independent of the initial alignments. In exemplary embodiments, derivation forests may be built from a forced-decoding algorithm. For example, a standard CKY-style decoder used in machine translation may be configured to limit its search to the training pair. An exemplary CKY-style decoder is described in Galley et al. "Scalable Inference and Training of Context Rich Syntactic Models." Proceedings of the 44$^{th}$ Annual Meeting of the Association for Computational Linguistics (ACL) 2006.

In an exemplary step 412, one or more rule sequences in the derivation forest are selected. In some embodiments, all of the rule sequences may be selected. The rule sequences may be selected using an expectation-maximization (EM) algorithm. The EM algorithm selects rule sequences so as to maximize the probability of the entire training corpus comprising many annotated bilingual segment pairs. Thus, the EM algorithm may prefer to assign probabilities such that one rule or rule sequence is used many times rather than several different rules for the same situation.

If the annotated bilingual segment pair is re-labeled and/or re-aligned, the EM algorithm may be used to generate a set of probabilities based on which the rile sequence can be selected. A selected rule sequence, or a selected binarization, of a tree may be calculated according to the formula:

$$\beta^* = \operatorname*{argmax}_{\beta} p(\tau_\beta, f, a \mid \theta^*)$$

where $\beta^*$ is the binarization that results in the highest likelihood of the re-labeled or restructured training data comprising ($\tau_\beta$,f,a)-tuples. Other formulas or algorithms apparent to those skilled in the art may be used. In the tuples, $\tau_\beta$ represents a generated target tree, f represent a word or phrase in the source string, and a represents the alignment associated with f. Selected parameters or rule probabilities, $\theta^*$, are obtained such that:

$$\theta^* = \operatorname*{argmax}_{\theta} p(\tau, f, a)$$

$$\theta^* = \operatorname*{argmax}_{\theta} p(\beta, \tau, f, a)$$

$$\theta^* = \operatorname*{argmax}_{\theta} p(\tau_\beta, f, a)$$

where $(\beta,\tau)=\tau_\beta$ if bar notation is used to label the new intermediate nodes added using binarization. To store the binarizations, a packed forest may be used. For model estimation, an inside-outside algorithm may be used. The probability $p(\tau_\beta,f,a)$ of a ($\tau_\beta$,f,a)-tuple can be calculated by aggregating the rule probabilities p(r) in each derivation, $\omega$, in the set of all derivations, $\Omega$, using the equation:

$$p(\tau_\beta, f, a) = \frac{1}{|\Omega|} \sum_{\omega \in \Omega} \prod_{r \in \omega} p(r)$$

In some embodiments, the probability $p(\tau_\beta,f,a)$ may be decomposed using minimal rules during running of the EM algorithm.

In exemplary embodiments in which the annotated bilingual segment pair is re-aligned, EM algorithms described in U.S. nonprovisional patent application Ser. No. 11/082,216 filed Mar. 15, 2005 and entitled "Training Tree Transducers for Probabilistic Operations" may be used.

In exemplary step 414, the modified annotated bilingual segment pair may be distilled from the one or more selected rule sequences. The selected rule sequences may comprise Viterbi derivations and/or Viterbi alignments. From the rule sequences a modified annotated bilingual segment pair is generated as is known to those skilled in the art. The modified annotated bilingual segment pair may then be used to train an MT system.

Figure 5:
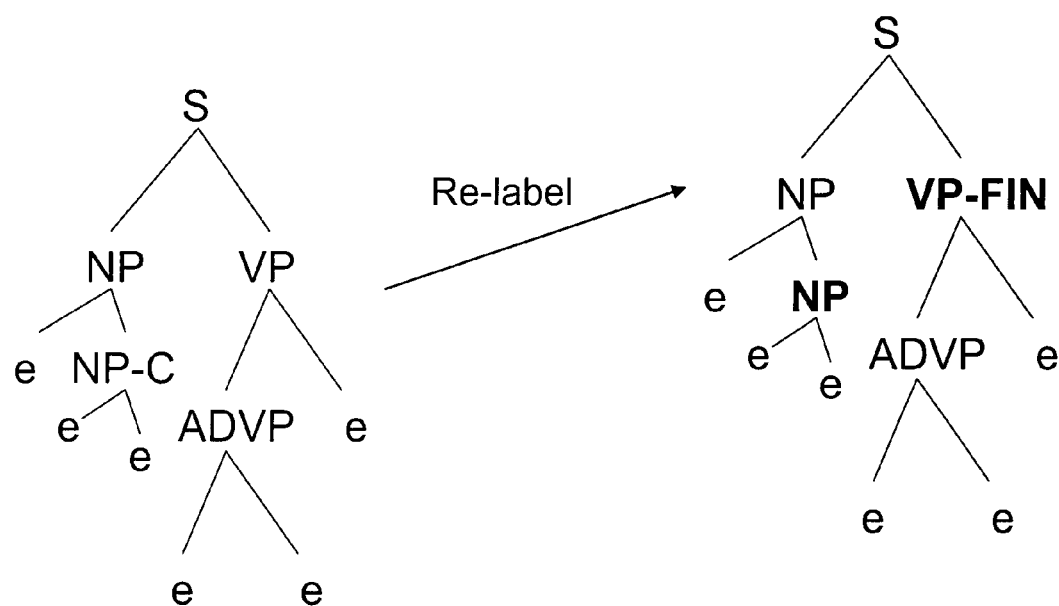
FIG. 5 is a diagram of an example of re-labeling an annotated bilingual segment pair according to various embodiments.

FIG. 5 is a diagram of an example of re-labeling an annotated bilingual segment pair according to various embodiments. Each node in the tree in the annotated bilingual segment pair is labeled with a syntactic category. The syntactic category may be, for example, sentence (S), noun phrase (NP), noun phrase-complement (NP-C), verb phrase (VP), adverb phrase (ADVP), or the like. Re-labeling comprises combining two or more types of syntactic categories into one category and/or dividing a syntactic category into two or more syntactic categories.

A first syntactic category may be combined with another syntactic category. For example, categories may be combined if the first syntactic category rarely occurs or the syntax of source language renders the category irrelevant. In these embodiments, the label may be changed to an existing label or a new label may be created for the combined category. For example, in FIG. 5, the syntactic category "NP-C" is combined with the category "NP." The syntactic label "NP" is now used to indicate both the syntactic categories noun phrase and noun phrase-complement.

A syntactic category may be added if a category is broadly defined. For example, the syntactic category "verb phrase" may include, in an English tree, both non-finite verbs such as "to go" and "going," and finite verbs such as "goes" and "went." In this instance, the category "finite verbs" (VP-FIN) may be added, as depicted in FIG. 5. In some embodiments, the syntactic category "VP" may be preserved.

Figure 6:
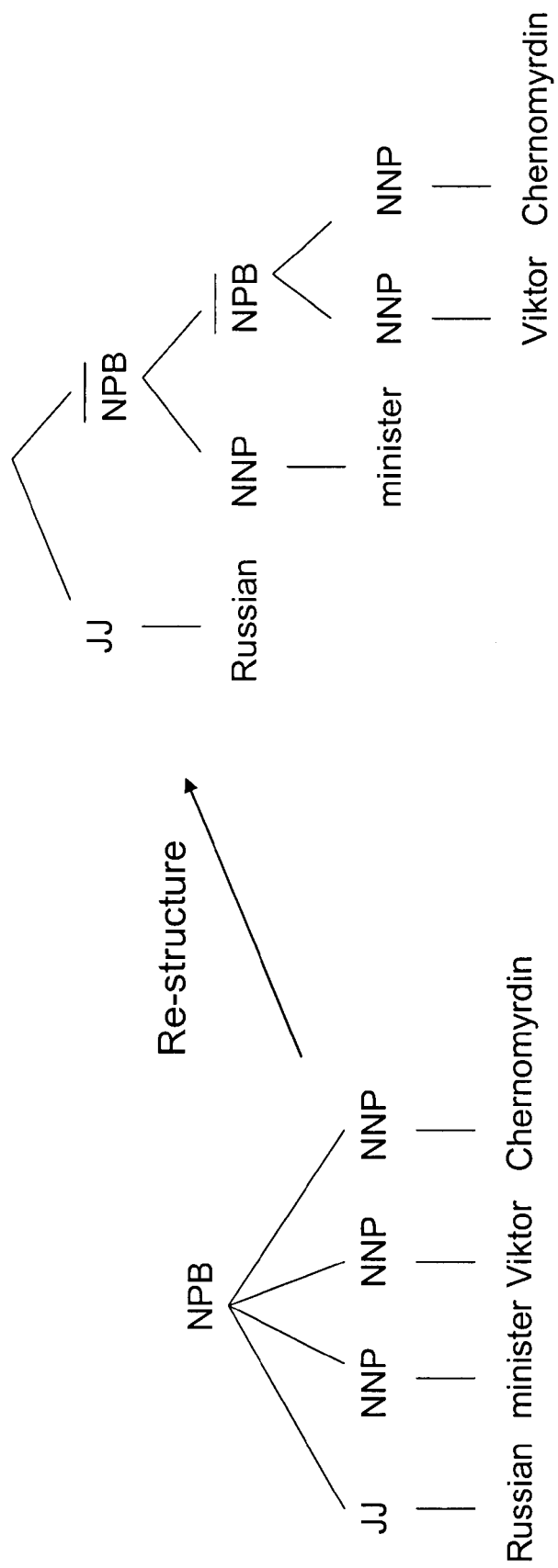
FIG. 6 is a diagram of an example of re-structuring an annotated bilingual segment pair according to various embodiments.

FIG. 6 is a diagram of an example of re-structuring an annotated bilingual segment pair according to various embodiments. More specifically, FIG. 6 depicts a diagram of a tree that has been right-binarized. In right-binarization, a new node is formed over the rightmost child and dominates all of the children except the furthest left child. The process is then repeated with respect to the children of the new node until only two children remain under the newest node. In other embodiments, left-binarization may be performed in which a new node is formed over the leftmost child as will be apparent to those skilled in the art. Parallel binarization includes performing both left and right binarization.

Figure 7:
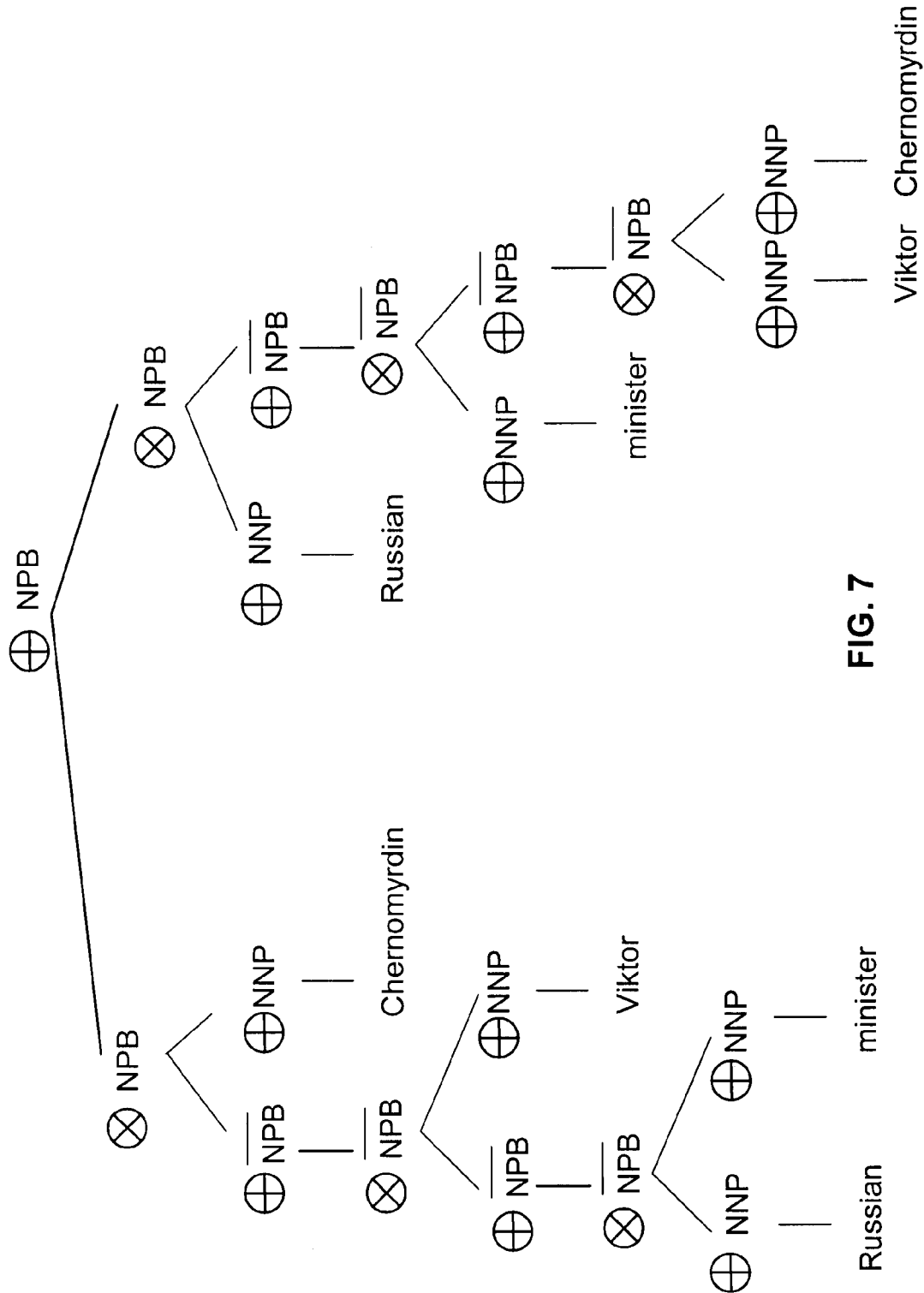
FIG. 7 is a diagram of an exemplary forest generated from an annotated bilingual segment pair according to various embodiments.

FIG. 7 is a diagram of an example of a forest comprising additive (⊕) and multiplicative (⊗) nodes. These nodes are added by first recursively parallel binarizing child nodes in the tree to generate additive nodes at each of the child nodes in the generated trees. Next, the nodes are right-binarized by adding an intermediate tree node. The intermediate tree node is recursively binarized to generate an additive binarization forest node. A multiplicative forest node is added as the parent of the intermediate tree node and the child. Then the nodes are left-binarized by adding an intermediate tree node. The intermediate tree node is recursively binarized to generate an additive binarization forest node. A multiplicative forest node is added as the parent of the intermediate tree node and the child. Finally, an additive node is added as the parent of the added multiplicative forest nodes.

Figure 8:
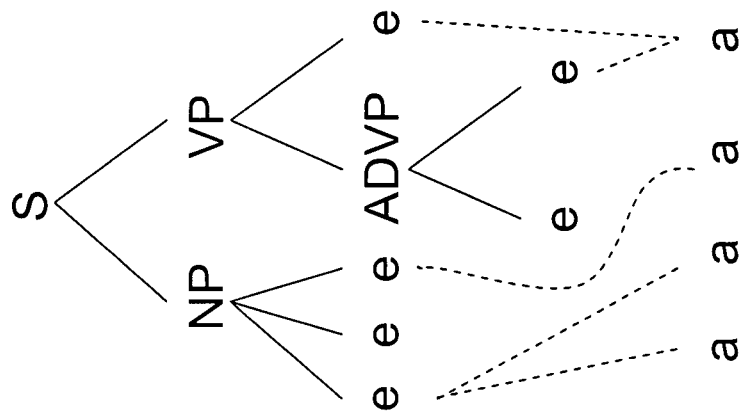
FIG. 8 is a diagram of an example of re-aligning an annotated bilingual segment pair according to various embodiments.
Figure 8:
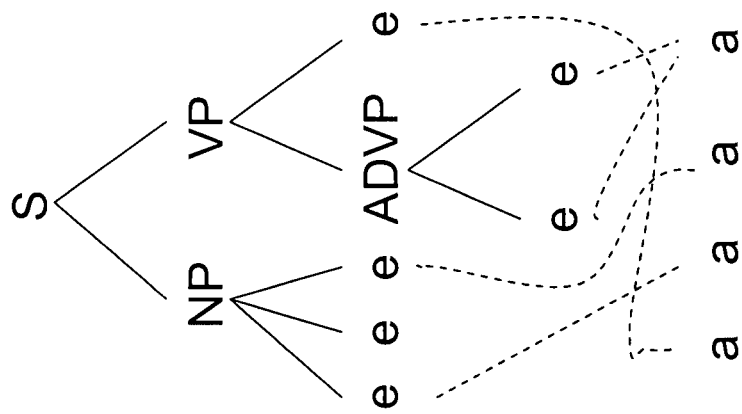

FIG. 8 is a diagram of an example of re-aligning an annotated bilingual segment pair according to various embodiments. The annotated bilingual segment pair 902 may comprise a tree-to-string annotated bilingual segment pair, a tree-to-tree annotated bilingual segment pair, or a string-to-tree annotated bilingual segment pair. In the embodiment shown, the annotated bilingual segment pair 902 comprises a string-to-tree annotated bilingual segment pair. The alignments in the annotated bilingual segment pairs may have been generated without regard to syntactic structure and/or the use of a tree and, therefore, may be inaccurate. To extract translation rules from the alignments, an alignment algorithm, such as the algorithm described in Galley et al. "What's in a Translation Rule" HLT-NAACL 2004: Main Proceedings, pages 273-280, may be used. In embodiments where the annotated bilingual segment pair is re-aligned, a target forest may not be generated.

Figure 9:
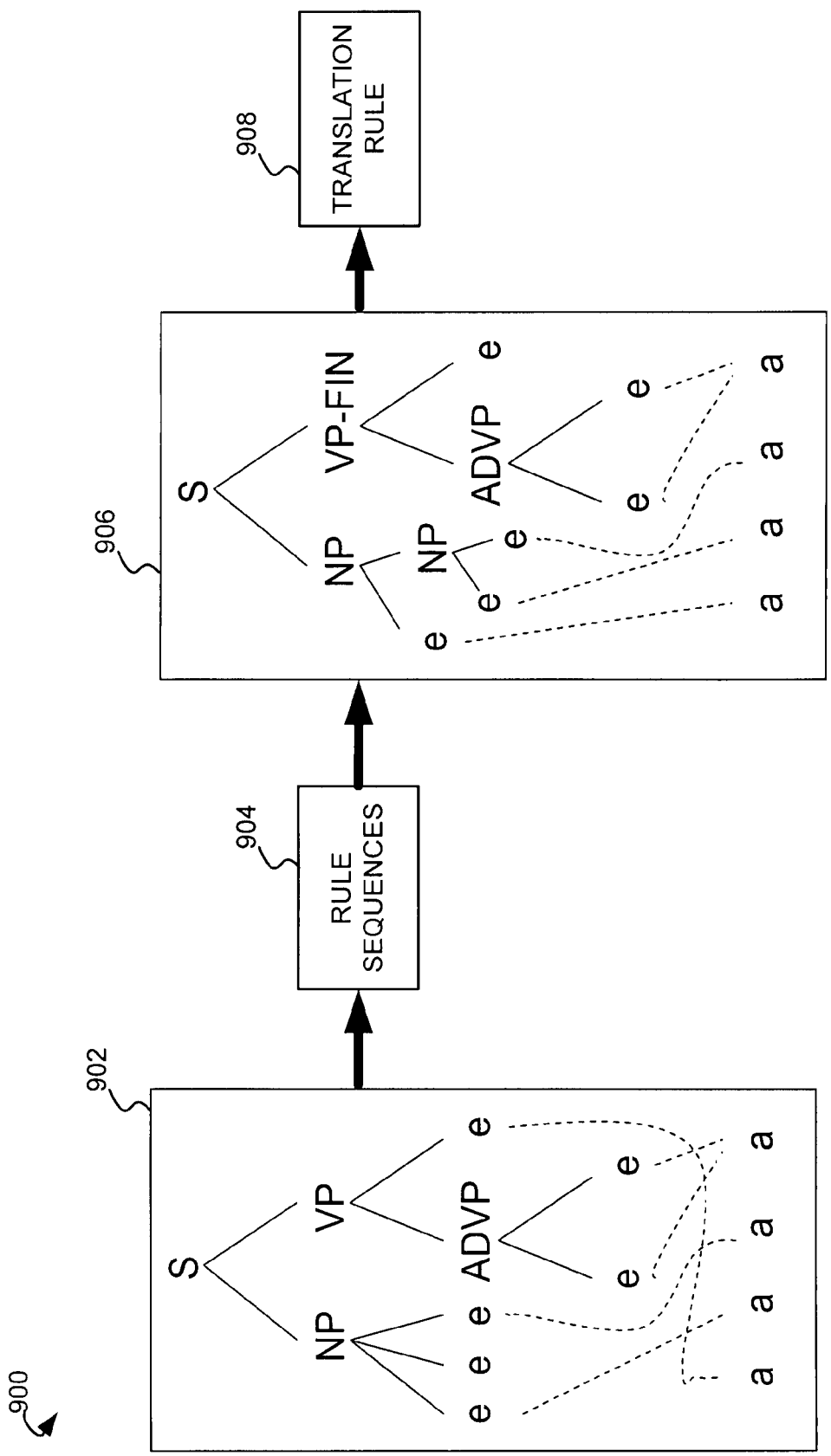
FIG. 9 is a diagram of a process for deriving translation rules from a received annotated bilingual segment pair.

FIG. 9 is a diagram of a process 900 for deriving translation rules from a received annotated bilingual segment pair. In the process 900, an annotated bilingual segment pair 902 is received. The annotated bilingual segment pair 902 may comprise a tree-to-string annotated bilingual segment pair, a tree-to-tree annotated bilingual segment pair, or a string-to-tree annotated bilingual segment pair. In the embodiment shown, the annotated bilingual segment pair 902 comprises a string-to-tree annotated bilingual segment pair. Next, based on the received annotated bilingual segment pair 902, a set of rule sequences 904 are generated. According to some embodiments, the rule sequences may be generated by re-labeling, re-structuring, and/or re-aligning the received annotated bilingual segment pair 902. From the rule sequences 904, a modified annotated bilingual segment pair 906 is generated. The modified annotated bilingual segment pair 906 may then be used to generate translation rules 908 that can be used to train an MT system.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with various embodiments. Those skilled in the art are familiar with instructions, processor(s), and storage medium.

While various embodiments have been described above, it should be understood that they have been presented by way of example only, and not limitation. The scope of the present disclosure is in no way limited to the languages used to describe exemplary embodiments. Thus, the breadth and scope of a preferred embodiment should not be limited by any of the above-described exemplary embodiments.

What is claimed is:

1. A method for generating a tree to string annotated bilingual segment pair, the method comprising:
   receiving a first annotated bilingual segment pair comprising two or more words in a source language, two or more words in a target language, and an alignment between the two or more words in the source language and the two or more words in the target language;
   processing, by a computer, the first annotated bilingual segment pair to generate a target forest including a plurality of trees, each tree representing an alternative annotated bilingual segment pair including an alignment rule sequence that can be used to express a relationship between the words in the bilingual segment pair, the processing of the first annotated bilingual segment pair by the computer including re-labeling, re-structuring, and re-aligning the first annotated bilingual segment pair;

building a derivation forest from the target forest, the derivation forest including a plurality of trees;

deriving, by the computer, a plurality of rule sequences for the plurality of trees in the derivation forest, each tree in the derivation forest including a set of rule sequences derived from a tree in the target forest;

selecting one of the derived rule sequences based on a probability that the selected rule sequence is more likely than the other derived rule sequences, using an expectation-maximization algorithm;

generating, by the computer, a second annotated bilingual segment pair based on the selected rule sequence, wherein the second annotated bilingual segment pair has an alignment; and extracting translation rules from the second annotated bilingual segment pair based on the alignment of the second annotated bilingual segment pair.

2. The method recited in claim 1, wherein processing the first annotated bilingual segment pair comprises re-structuring a first tree in the first annotated bilingual segment pair or re-aligning the first annotated bilingual segment pair.

3. The method recited in claim 1, wherein re-labeling syntactic structures comprises combining two or more of the syntactic structures.

4. The method recited in claim 1, wherein processing the first annotated bilingual segment pair further comprises:
re-structuring a first tree in the first annotated bilingual segment pair to generate the plurality of the trees.

5. The method recited in claim 4, wherein re-structuring the first tree comprises adding a new parent node to include a subset of existing nodes.

6. The method recited in claim 1, wherein processing the first annotated bilingual segment pair further comprises:
extracting translation rules from the first annotated bilingual segment pair based on the alignment, wherein the plurality of the trees includes the translation rules.

7. The method recited in claim 1, further comprising:
training a translation engine using the second annotated bilingual segment pair.

8. The method recited in claim 1, wherein selecting one of the rule sequences comprises summing weights associated with at least a portion of the plurality of the trees.

9. The method recited in claim 1, wherein the first annotated bilingual segment pair and the second annotated bilingual segment pair both comprise a tree-to-string annotated bilingual segment pair.

10. The method recited in claim 1, wherein the first annotated bilingual segment pair and the second annotated bilingual segment pair both comprise a tree-to-tree annotated bilingual segment pair.

11. The method recited in claim 1, wherein the first annotated bilingual segment pair and the second annotated bilingual segment pair both comprise a string-to-tree annotated bilingual segment pair.

12. A system for generating a tree to string annotated bilingual segment pair, the system comprising:
a processor configured to:
receive a first annotated bilingual segment pair to generate a plurality of trees, the first annotated bilingual segment pair comprising two or more words in a source language, two or more words in a target language, and an initial alignment between the two or more words in the source language and the two or more words in the target language, and process the first annotated bilingual segment pair, the processing including:
re-labeling, restructuring, and re-aligning the first annotated bilingual segment pair, to generate
a plurality of target trees, each tree representing an alternative annotated bilingual segment pair including an alignment rule sequence that can be used to express a relationship between the words in the bilingual segment pair;
a derivation module configured to derive a plurality of derivation trees from the plurality of the target trees, each derivation tree including a rule sequence derived from a target tree;
a training module configured to select one of the derived rule sequences, based on a probability that the selected rule sequence is more likely than the other derived rule sequences, using an expectation-maximization algorithm; and
a distillation module configured to generate a second annotated bilingual segment pair based on the selected rule sequence, and produce translation rules from the second annotated bilingual segment pair.

13. The system recited in claim 12, wherein the processor is further configured to re-structure a first tree in the first annotated bilingual segment pair or re-align the first annotated bilingual segment pair.

14. The system recited in claim 12, wherein the processor is further configured to re-structure a first tree in the first annotated bilingual segment pair.

15. The system recited in claim 12, wherein the processor is further configured to extract translation rules from the first annotated bilingual segment pair based on the alignment.

16. The system recited in claim 12, wherein the first annotated bilingual segment pair and the second annotated bilingual segment pair both comprise a tree-to-string annotated bilingual segment pair.

17. A non-transitory computer readable storage medium having embodied thereon a program, the program being executable by a processor for performing a method for generating an annotated bilingual segment pair, the method comprising:
receiving a first annotated bilingual segment pair comprising a source string including two or more words in a source language, a target phrase represented as a first tree that includes two or more words in a target language, and an alignment between the source string and the first tree;
processing the first annotated bilingual segment pair, the processing of the first annotated bilingual pair including:
re-labeling one or more nodes of a tree representing the first annotated bilingual segment pair,
re-structuring the tree representing the annotated bilingual segment pair, including adding parent nodes to the tree,
re-aligning the first annotated bilingual segment pair, and
generating a target forest including a plurality of target trees based on the re-labeling, re-structuring, and re-aligning;
building a derivation forest of a plurality of derivation trees based on the target forest, each derivation tree representing a rule sequence that corresponds to target tree;
deriving a plurality of rule sequences from the plurality of the derivation trees;
calculating a probability using an expectation-maximization algorithm that the derived rule sequence is correct for each of the derived rule sequences;

selecting the rule sequences having the highest probability;

generating a second annotated bilingual segment pair based on the selected rule sequence, wherein the second annotated bilingual segment pair has an alignment; and extracting translation rules from the second annotated bilingual segment pair based on the alignment of the second annotated bilingual segment pair.

18. The non-transitory computer readable storage medium recited in claim 17, wherein processing the first annotated bilingual segment pair comprises re-structuring the first tree in the first annotated bilingual segment pair or re-aligning the first annotated bilingual segment pair.

19. The non-transitory computer readable storage medium recited in claim 17, wherein re-labeling syntactic structures comprises combining two or more of the syntactic structures.

20. The non-transitory computer readable storage medium recited in claim 17, wherein processing the first annotated bilingual segment pair further comprises:

re-structuring the first tree in the first annotated bilingual segment pair to generate the plurality of the trees.

21. The non-transitory computer readable storage medium recited in claim 20, wherein re-structuring the first tree comprises adding a new parent node to include a subset of existing nodes.

22. The non-transitory computer readable storage medium recited in claim 17, wherein processing the first annotated bilingual segment pair further comprises:

extracting translation rules from the first annotated bilingual segment pair based on the alignment, wherein the plurality of the trees includes the translation rules.

23. The non-transitory computer readable storage medium recited in claim 17, wherein the method further comprises:

training a translation engine using the second annotated bilingual segment pair.

24. The non-transitory computer readable storage medium recited in claim 17, wherein selecting one or more of the rule sequences comprises summing weights associated with at least a portion of the plurality of the derivation trees.

25. The non-transitory computer readable storage medium recited in claim 17, wherein the first annotated bilingual segment pair and the second annotated bilingual segment pair both comprise a tree-to-string annotated bilingual segment pair.

26. The non-transitory computer readable storage medium recited in claim 17, wherein the first annotated bilingual segment pair and the second annotated bilingual segment pair both comprise a tree-to-tree annotated bilingual segment pair.

27. The non-transitory computer readable storage medium recited in claim 17, wherein the first annotated bilingual segment pair and the second annotated bilingual segment pair both comprise a string-to-tree annotated bilingual segment pair.

* * * * *